(12) United States Patent
Zhang et al.

(10) Patent No.: US 12,498,730 B2
(45) Date of Patent: Dec. 16, 2025

(54) UNMANNED AERIAL VEHICLE, CONTROL METHOD AND CONTROL SYSTEM THEREOF, HANDHELD CONTROL DEVICE, AND HEAD-MOUNTED DEVICE

(71) Applicant: SZ DJI TECHNOLOGY CO., LTD., Shenzhen (CN)

(72) Inventors: Litian Zhang, Shenzhen (CN); Tianye Xu, Shenzhen (CN); Xiaoying Huang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 137 days.

(21) Appl. No.: 18/332,852

(22) Filed: Jun. 12, 2023

(65) Prior Publication Data

US 2023/0341875 A1 Oct. 26, 2023

Related U.S. Application Data

(63) Continuation of application No. PCT/CN2021/077755, filed on Feb. 24, 2021.

(30) Foreign Application Priority Data

Dec. 25, 2020 (CN) .......................... 202011567706.8

(51) Int. Cl.
*B64U 20/87* (2023.01)
*G05D 1/00* (2006.01)
*B64U 101/30* (2023.01)

(52) U.S. Cl.
CPC ........... *G05D 1/0808* (2013.01); *B64U 20/87* (2023.01); *G05D 1/0016* (2013.01);
(Continued)

(58) Field of Classification Search
CPC .. G05D 1/0808; G05D 1/0016; G05D 1/0038; B64U 20/87; B64U 2201/20; B64U 2101/30
See application file for complete search history.

(56) References Cited

U.S. PATENT DOCUMENTS 7,584,071 B2 9/2009 Lee
7,931,239 B2 4/2011 Pedersen et al.
(Continued)

FOREIGN PATENT DOCUMENTS

CN 106020219 A 10/2016
CN 108008730 A 5/2018
(Continued)

OTHER PUBLICATIONS

English translation of WO 2017047546 A1 (Year: 2017).*
(Continued)

*Primary Examiner* — Navid Z. Mehdizadeh
*Assistant Examiner* — Matthew Ho
(74) *Attorney, Agent, or Firm* — ANOVA LAW GROUP, PLLC

(57) ABSTRACT

A movable object control method includes obtaining attitude information of a handheld control device, determining control information of a movable object according to the attitude information of the handheld control device, and sending the control information of the movable object to a head-mounted device to enable the head-mounted device to display a mark on a display device of the head-mounted device according to the control information of the movable object. The mark indicates a moving direction of the movable object.

19 Claims, 13 Drawing Sheets

(52) U.S. Cl.
CPC ....... *G05D 1/0038* (2013.01); *B64U 2101/30* (2023.01); *B64U 2201/20* (2023.01)

(56) References Cited

U.S. PATENT DOCUMENTS

| | | | |
|---|---|---|---|
| 8,106,748 | B2 | 1/2012 | Lee |
| 9,073,532 | B2 | 7/2015 | Pedersen et al. |
| 9,645,580 | B2 | 5/2017 | Pedersen et al. |
| 9,904,292 | B2 | 2/2018 | Pedersen et al. |
| 10,152,052 | B1* | 12/2018 | Lu ............................ G06F 3/017 |
| 2005/0004723 | A1* | 1/2005 | Duggan ............... G05D 1/0061 701/13 |
| 2014/0008496 | A1 | 1/2014 | Ye et al. |
| 2019/0220002 | A1* | 7/2019 | Huang ................ H04N 13/156 |

FOREIGN PATENT DOCUMENTS

| | | | |
|---|---|---|---|
| CN | 108170153 | A | 6/2018 |
| CN | 207924888 | U | 9/2018 |
| CN | 108700893 | A | 10/2018 |
| CN | 109144378 | A | 1/2019 |
| CN | 112099529 | A | 12/2020 |
| WO | WO-2017047546 | A1 * | 3/2017 ............. B64C 13/20 |
| WO | 2018184232 | A1 | 10/2018 |
| WO | 2019040008 | A1 | 2/2019 |
| WO | 2019183789 | A1 | 10/2019 |

OTHER PUBLICATIONS

The World Intellectual Property Organization (WIPO) International Search Report for PCT/CN2021/077755 Sep. 15, 2021 7 pages (including English translation).

* cited by examiner

UNMANNED AERIAL VEHICLE, CONTROL METHOD AND CONTROL SYSTEM THEREOF, HANDHELD CONTROL DEVICE, AND HEAD-MOUNTED DEVICE

CROSS-REFERENCE TO RELATED APPLICATIONS

This application is a continuation of International Application No. PCT/CN2021/077755, filed Feb. 24, 2021, which claims priority to Chinese Application No. 202011567706.8, filed Dec. 25, 2020, the entire contents of both of which are incorporated herein by reference.

TECHNICAL FIELD

The present disclosure relates to the field of movable object and, more particularly, to a movable object, a control method and a control system thereof, a handheld control device, a head-mounted device, and a storage medium.

BACKGROUND

Unmanned aerial vehicles have been widely used in scenarios such as aerial photography, inspection, forest protection, disaster investigation, or pesticide spraying. However, existing control of unmanned aerial vehicles of operators is mainly achieved through accelerators of remote controllers. There is only single control method and the user experience is poor.

SUMMARY

In accordance with the disclosure, there is provided a movable object control method including obtaining attitude information of a handheld control device, determining control information of a movable object according to the attitude information of the handheld control device, and sending the control information of the movable object to a head-mounted device to enable the head-mounted device to display a mark on a display device of the head-mounted device according to the control information of the movable object. The mark indicates a moving direction of the movable object.

Also in accordance with the disclosure, there is provided a handheld control device including an attitude sensor configured to obtain attitude information of the handheld control device and a communication circuit configured to send the attitude information of the handheld control device to a movable object to enable the movable object to determine control information of the movable object according to the attitude information of the handheld control device. The communication circuit is further configured to send the control information of the movable object to a head-mounted device to enable the head-mounted device to display a mark on a display device of the head-mounted device according to the control information of the movable object. The mark indicates a moving direction of the movable object.

Also in accordance with the disclosure, there is provided a movable object including a first communication circuit, one or more processors, and a second communication circuit. The first communication circuit is configured to obtain attitude information of a handheld control device. The one or more processors is configured to work individually or jointly to determine control information of the movable object according to the attitude information of the handheld control device. The second communication circuit is configured to send the control information of the movable object to a head-mounted device to enable the head-mounted device to display a mark on a display device of the head-mounted device according to the control information of the movable object. The mark indicates the moving direction of the movable object.

DETAILED DESCRIPTION OF THE EMBODIMENTS

Figure 1:
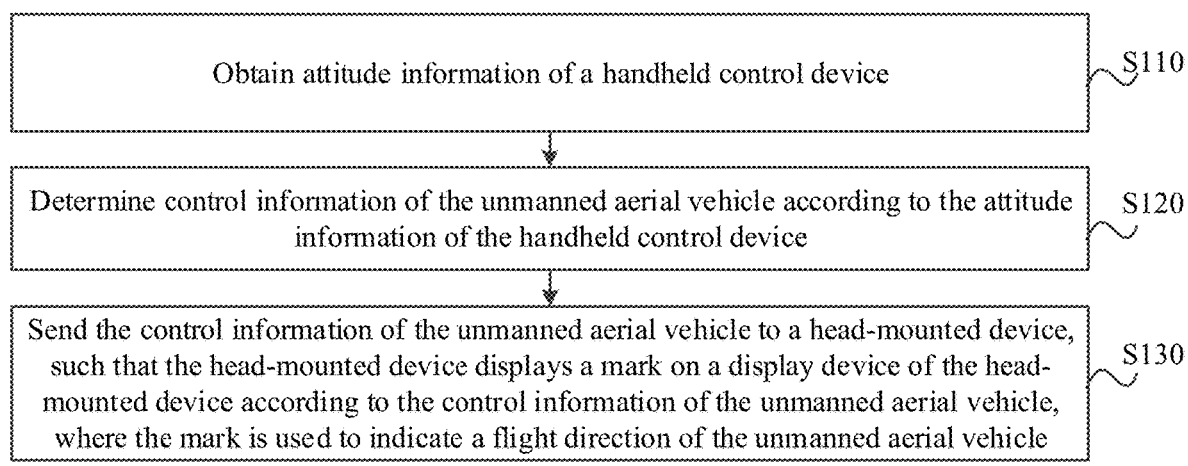
FIG. 1 is a schematic flow chart of a control method of an unmanned aerial vehicle consistent with the present disclosure.

The technical solutions of the present disclosure will be described below in conjunction with the drawings in the embodiments of the present disclosure. Obviously, the described embodiments are some of the embodiments of the present disclosure, but not all of the embodiments. Based on the embodiments in this disclosure, all other embodiments obtained by those of ordinary skill in the art without creative work shall fall within the scope of this disclosure.

The flow charts shown in the drawings are just illustrations, and do not necessarily include all contents and operations/steps, nor must they be performed in the order described. For example, some operations/steps can be decomposed, combined or partly combined, so the actual order of execution may be changed according to the actual situation.

The embodiments of the present disclosure will be described below in conjunction with the drawings in the embodiments of the present disclosure. In the case of no conflict, the following embodiments and features in the embodiments may be combined with each other.

Figure 2:
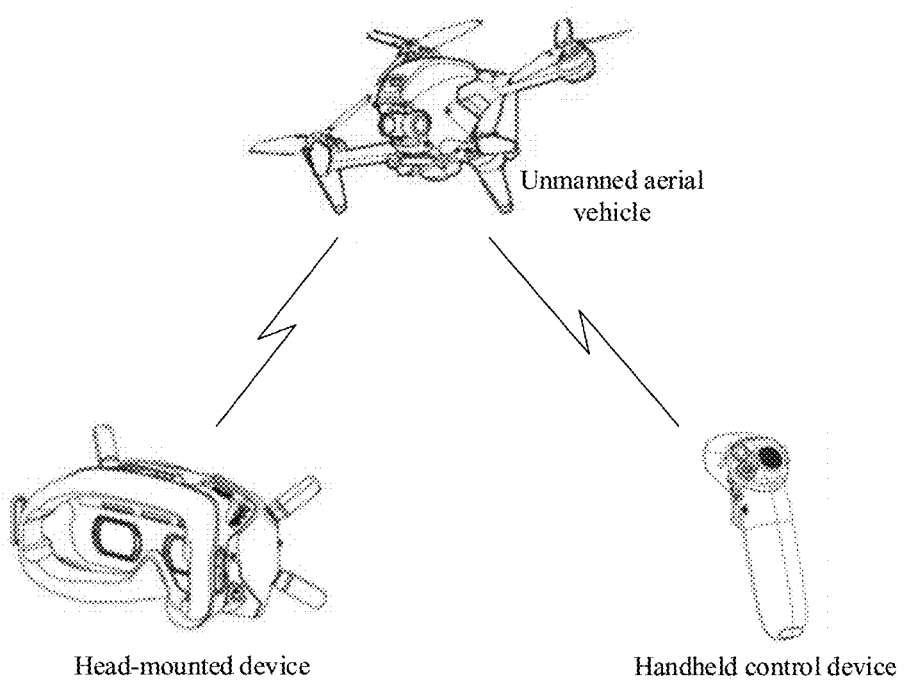
FIG. 2 is a schematic diagram showing communication connection among an unmanned aerial vehicle, a handheld control device, and a head-mounted device, consistent with the present disclosure.

The present disclosure provides a control method of an unmanned aerial vehicle. FIG. 1 is a schematic flow chart of a control method of an unmanned aerial vehicle provided by one embodiment of the present disclosure, and FIG. 2 is a schematic diagram showing an application scenario of the control method. In the present disclosure, unmanned aerial vehicle and control method of unmanned aerial vehicle are described as examples. The subject of the present disclosure can also be any movable object, such as an aerial vehicle, and the control method consistent with the present disclosure can also be applied to such movable object such as aerial vehicle.

As shown in FIG. 2, an unmanned aerial vehicle control system includes an unmanned aerial vehicle, a handheld control device, and a head-mounted device.

The control method of the unmanned aerial vehicle may be applied to the unmanned aerial vehicle or the handheld control device, and may be used in the processes such as controlling the unmanned aerial vehicle according to attitude information of the handheld control device.

In some embodiments, the control method of the unmanned aerial vehicle may be applied to the unmanned aerial vehicle. The unmanned aerial vehicle may obtain the attitude information sent by the handheld control device, determine the control information of the unmanned aerial vehicle according to the attitude information of the handheld control device, perform corresponding actions according to the control information, and send the control information of the unmanned aerial vehicle to the head-mounted device, such that the head-mounted device displays a mark on a display device of the head-mounted device according to the control information of the unmanned aerial vehicle. The mark may be used to indicate the flight direction of the unmanned aerial vehicle (or in general a moving direction of the movable object).

In some other embodiments, the control method of the unmanned aerial vehicle may be applied to the handheld control device. The handheld control device may obtain its own attitude information, determine the control information of the unmanned aerial vehicle according to the attitude information, and send the control information of the unmanned aerial vehicle to the unmanned aerial vehicle, such that the unmanned aerial vehicle performs corresponding actions according to the control information and sends the control information of the unmanned aerial vehicle to the head-mounted device. The head-mounted device may display a mark on the display device of the head-mounted device according to the control information of the unmanned aerial vehicle. The mark may be used to indicate the flight direction of the unmanned aerial vehicle.

In some embodiments, the control method of the unmanned aerial vehicle may be applied to the head-mounted device. The head-mounted device may obtain the attitude information sent by the handheld control device, determine the control information of the unmanned aerial vehicle according to the attitude information of the handheld control device, and send the control information of the unmanned aerial vehicle to the unmanned aerial vehicle, such that the unmanned aerial vehicle performs corresponding actions according to the control information. The head-mounted device may also display a mark on the display device of the head-mounted device according to the control information of the unmanned aerial vehicle. The mark may be used to indicate the flight direction of the unmanned aerial vehicle.

By displaying the mark on the display device of the head-mounted device to indicate the flight direction of the unmanned aerial vehicle, it may be easier for the user to become familiar with controlling the flight of the unmanned aerial vehicle through the handheld control device.

In some embodiments, the unmanned aerial vehicle may include a photographing device. The unmanned aerial vehicle may send image information captured by the photographing device to the head-mounted device, such that the display device of the head-mounted device superimposes and displays the image information and the mark. The user may be able to intuitively see scenes corresponding to the flight direction from the display device of the head-mounted device, to predict a photographing effect and collision risk. By displaying images sent back from the unmanned aerial vehicle to the head-mounted device on the display device of the head-mounted device, that is, the image transmission screen, when the user wears the head-mounted device to control the flight of the unmanned aerial vehicle, the user may be able to control the direction of movement of the unmanned aerial vehicle within their field of vision. The control may be more intuitive, and it may be like a bird flying experience.

Exemplarily, in one embodiment, the attitude information of the handheld control device may be directly sent to the unmanned aerial vehicle. As shown in FIG. 2, the attitude information is sent to the unmanned aerial vehicle through a communication channel between the handheld control device and the unmanned aerial vehicle.

For description purposes only, the embodiment in FIG. 2 with the communication connection between the handheld control device, the unmanned aerial vehicle, and the head-mounted device is used as an example to illustrate the present disclosure, and does not limit the scopes of the present disclosure. In some other embodiments, the handheld control device may communicate with the unmanned aerial vehicle through the head-mounted device, or the head-mounted device may communicate with the unmanned aerial vehicle through the handheld control device. In some other embodiments, the handheld control device and the head-mounted device may communicate with the unmanned aerial vehicle through a relay device.

Exemplarily, in one embodiment, the attitude information of the handheld control device may be sent to the unmanned aerial vehicle through the head-mounted device. For example, when the handheld control device is connected to the head-mounted device, the attitude information of the handheld control device may be first sent to the head-mounted device, and then the head-mounted device may forward the attitude information to the unmanned aerial vehicle. The attitude information may be transmitted through the communication channel between the head-mounted device and the unmanned aerial vehicle. This communication channel may have high gain and the transmission may be more reliable.

Exemplarily, in one embodiment, the control information of the unmanned aerial vehicle determined by the handheld control device may be directly sent to the unmanned aerial vehicle, or may be sent to the unmanned aerial vehicle through the head-mounted device and the transmission may be more reliable.

The unmanned aerial vehicle may be a rotor-type unmanned aerial vehicle (such as a quad-rotor unmanned aerial vehicle, a six-rotor unmanned aerial vehicle, or an octo-rotor unmanned aerial vehicle), or a fixed-wing unmanned aerial vehicle. The head-mounted device may be glasses/goggles, for example, first person view (FPV) glasses/goggles.

Figure 3:
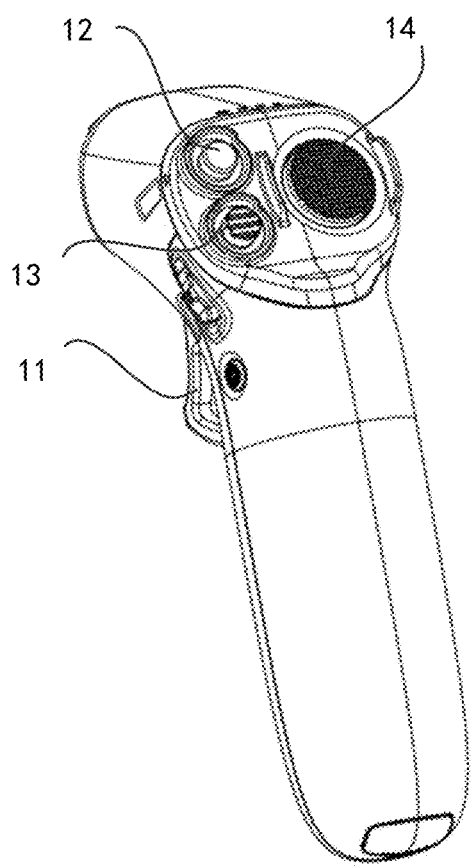
FIG. 3 is a schematic structure diagram of a handheld control device consistent with the present disclosure.

The handheld control device may include, for example, a motion-sensing remote control device. In one embodiment, as shown in FIG. 3, the handheld control device includes a plurality of buttons, and an accelerator device 11. The buttons include, for example, a lock button 12, a gear button 13, and an emergency stop (brake) button 14. It can be understood that the buttons corresponding to different functions and/or the function trigger logic of the buttons may be configured according to actual conditions.

Exemplarily, in one embodiment, the accelerator device may include, for example, a pullable accelerator, and of course may include other forms of control components, such as knobs, triggers, etc. The user may realize the flight control of the unmanned aerial vehicle by changing the attitude of the handheld control device, operating the buttons and accelerator parts of the handheld control device.

Exemplarily, in one embodiment, the handheld control device may include a sensor, and the sensor of the handheld control device may be used to collect the attitude information of the handheld control device. The attitude information may include at least one of a pitch angle, a yaw angle, a roll angle, horizontal moving speed, vertical moving speed, or a height above the ground. For example, the sensor of the handheld control device may include at least one of an inertial measurement unit (IMU), a compass, a gravity sensor, or a distance sensor.

In some embodiments, data may be transmitted between the handheld control device, the head-mounted device and the unmanned aerial vehicle through a wireless communication channel.

Exemplarily, as shown in FIG. 2, the wireless communication channel from the unmanned aerial vehicle to the handheld control device and the head-mounted device is called a downlink channel, which is used to transmit data collected by the unmanned aerial vehicle, for example, telemetry data such as video, pictures, sensor data, or the status information (OSD) of the unmanned aerial vehicle.

Exemplarily, as shown in FIG. 2, the wireless communication channel from the handheld control device, the head-mounted device to the unmanned aerial vehicle is called an uplink channel, which is used to transmit remote control data. For example, the uplink channel is used to transmit flight control instructions and other control commands for taking pictures and videos, or return.

As shown in FIG. 1, in one embodiment, the control method of the unmanned aerial vehicle includes S110 to S130.

At S110, the attitude information of the handheld control device is obtained.

Exemplarily, according to the three-axis acceleration signal and angular speed signal of the handheld control device itself, the attitude information of the handheld control device may be obtained through a fusion algorithm. The attitude information of the handheld control device may include, for example, the rotation quaternion of the handheld control device itself relative to the earth coordinate system.

Exemplarily, the attitude information of the handheld control device may include attitude information in the north-east earth coordinate system. Optionally, in some other embodiments, the attitude information may be also in other coordinate systems, such as the north-east sky coordinate system.

Figure 4:
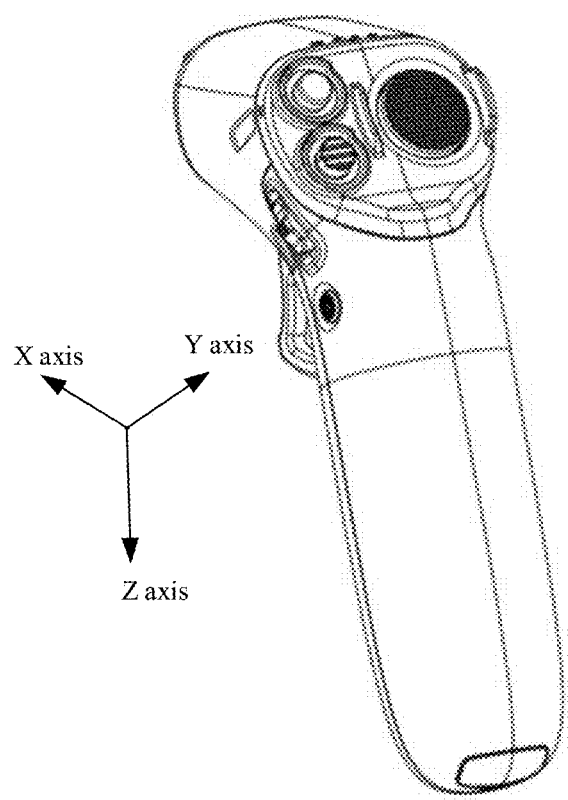
FIG. 4 is a schematic diagram showing a coordination system of a handheld control device consistent with the present disclosure.

In some embodiments, the coordinate system corresponding to the handheld control device is shown in FIG. 4. As shown in FIG. 4, the bottom of the handheld control device is the Z-axis direction, the right side is the Y-axis direction, and the front is the X-axis direction.

Figure 5:
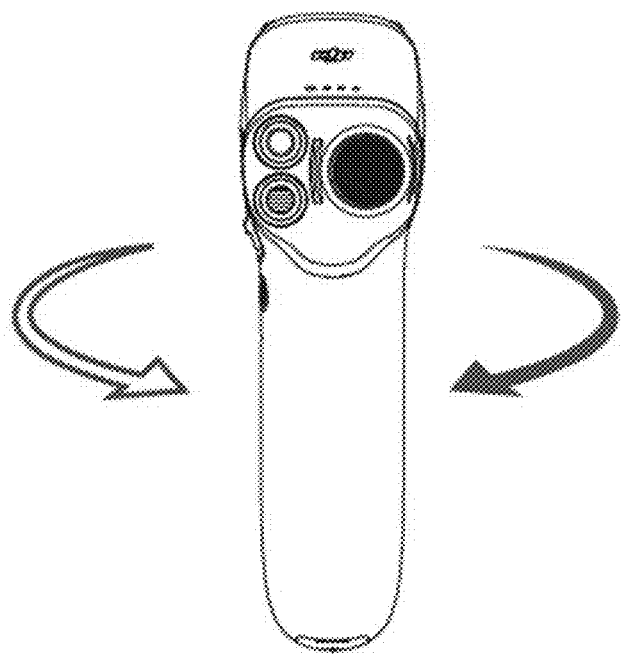
FIG. 5 is a schematic diagram showing attitude adjustment in the yaw direction of a handheld control device consistent with the present disclosure.
Figure 6:
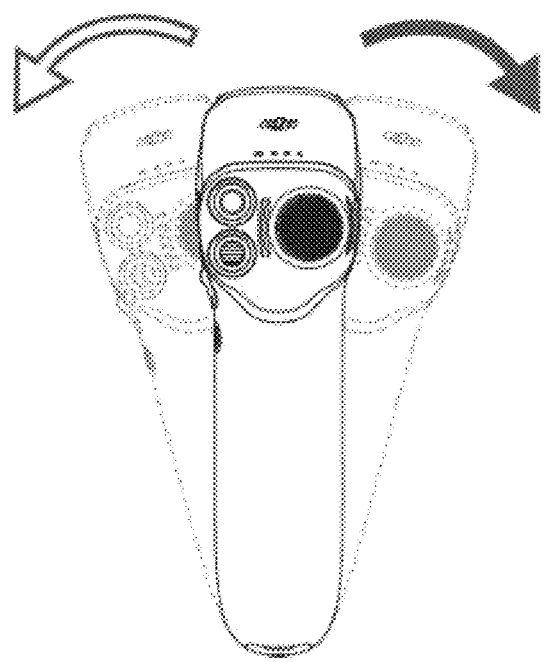
FIG. 6 is a schematic diagram showing attitude adjustment in the roll direction of a handheld control device consistent with the present disclosure.
Figure 7:
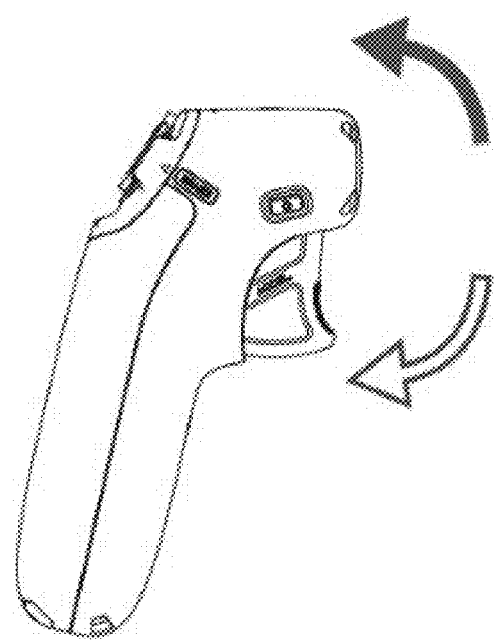
FIG. 7 is a schematic diagram showing attitude adjustment in the pitch direction of a handheld control device consistent with the present disclosure.

Exemplarily, as shown in FIG. 5, rotation of the handheld control device around the Z axis is called adjusting the attitude in the yaw direction. As shown in FIG. 6, rotation of the handheld control device around the X axis is called adjusting the attitude in the roll direction. As shown in FIG. 7, rotation of the handheld control device around the Y axis is called adjusting the attitude in the pitch direction.

Exemplarily, the angle at which the handheld control device rotates around the Z axis is called a yaw angle, the angle at which the handheld control device rotates around the Y axis is called a pitch angle, and the angle at which the handheld control device rotates around the X axis is called a roll angle. In some embodiments, the attitude information of the handheld control device may include at least one of the yaw angle, the roll angle, or the pitch angle. It can be understood that the attitude adjustment of the handheld control device is able to be decomposed into rotations in three directions, so the yaw angle, the roll angle and the pitch angle of the handheld control device can be determined.

At S120, the control information of the unmanned aerial vehicle is determined according to the attitude information of the handheld control device.

Exemplarily, the control information of the unmanned aerial vehicle may be determined according to the attitude adjustment angles of the handheld control device in various directions, and the control information of the unmanned aerial vehicle may be used to control the unmanned aerial vehicle to adjust the attitude of the body of the unmanned aerial vehicle body and/or the attitude of the gimbal carried by the unmanned aerial vehicle.

Figure 8:
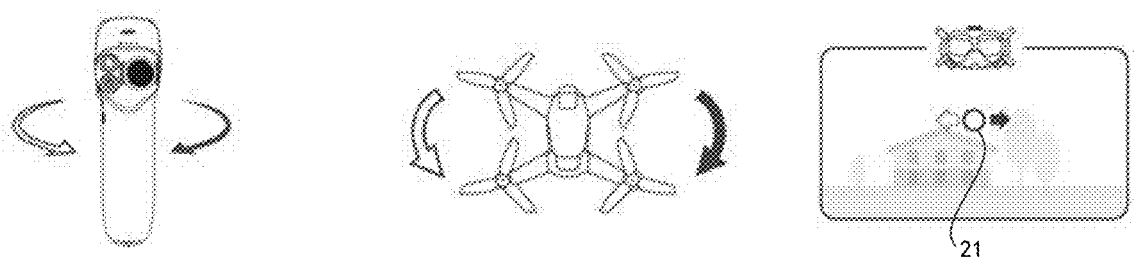
FIG. 8 is a schematic diagram showing determination of an unmanned aerial vehicle to rotate in the yaw direction according to the yaw angle of the handheld control device consistent with the present disclosure.
Figure 9:
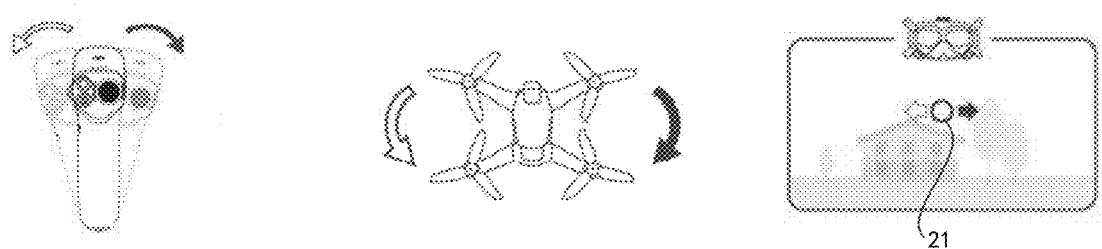
FIG. 9 is a schematic diagram showing determination of an unmanned aerial vehicle to rotate in the roll direction according to the roll angle of the handheld control device consistent with the present disclosure.
Figure 10:
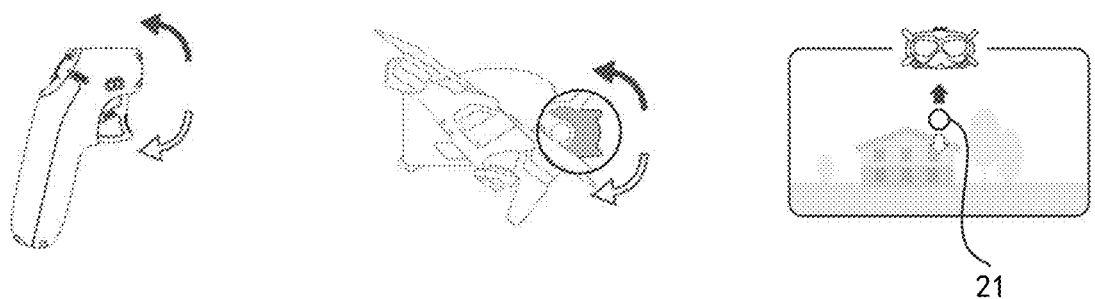
FIG. 10 is a schematic diagram showing determination of a gimbal of an unmanned aerial vehicle to rotate in the pitch direction according to the pitch angle of the handheld control device consistent with the present disclosure.

Exemplarily, as shown in FIG. 8, the control information determined according to the yaw angle of the handheld control device is used to control the unmanned aerial vehicle to rotate in the yaw direction. Of course, it is not limited to this. As shown in FIG. 9, the control information determined according to the roll angle of the handheld control device may also be used to control the unmanned aerial vehicle to rotate in the yaw direction. As shown in FIG. 10, the control information determined according to the pitch angle of the handheld control device can also be used to control the rotation of the gimbal of the unmanned aerial vehicle in the pitch direction.

At S130, the control information of the unmanned aerial vehicle is sent to the head-mounted device, such that the head-mounted device displays a mark on the display device of the head-mounted device according to the control information of the unmanned aerial vehicle. The mark is used to indicate the flight direction of the unmanned aerial vehicle.

In some implementations, as shown in FIG. 8 and FIG. 9, when the control information of the unmanned aerial vehicle is used to instruct the unmanned aerial vehicle o move left or right (rotate in the yaw direction), the mark 21 moves left or right and deviates from the central position in the lateral direction of the display device. As shown in FIG. 10, when the control information of the unmanned aerial vehicle is used to instruct the gimbal of the unmanned aerial vehicle to make a pitch movement (rotate in the pitch direction), the mark 21 moves upwards or downwards and deviate from the central position in the vertical direction of the display device. When the control information of the unmanned aerial vehicle is used to instruct the unmanned aerial vehicle to keep its attitude unchanged, the mark stays at the preset position of the display interface of the display device. For example, the preset position is located in the middle of the display interface. In this way, for example, wherever the user points the handheld control device, when the accelerator part of the handheld control device is operated, the unmanned aerial vehicle will fly there. It is easier for the user to become familiar with controlling the flight of the unmanned aerial vehicle through the handheld control device.

By displaying the mark on the display device of the head-mounted device to indicate the flight direction of the unmanned aerial vehicle, a more intuitive control experience may be provided to the user. By adjusting the attitude of the handheld control device, the user may be able to adjust the display position of the mark in the display device, and the mark may be able to indicate the direction of the future movement of the unmanned aerial vehicle on the display device, making flight manipulation easier and safer.

Exemplarily, when the front of the handheld control device is the X-axis direction, the movement direction of the unmanned aerial vehicle may be indicated according to the X-axis direction of the handheld control device. It can be understood that the X-axis direction can be used as the light emitted by the "flashlight" to indicate the direction of movement of the unmanned aerial vehicle. Therefore, controlling the direction of movement of the unmanned aerial vehicle according to the attitude information of the handheld control device may be called a flashlight mode.

In some embodiments, the unmanned aerial vehicle may include a photographing device.

Exemplarily, the method may further include: sending image information captured by the photographing device to the head-mounted device, such that the display device of the head-mounted device superimposes and displays the image information and the mark. The user may be able to intuitively see the scene corresponding to the flight direction from the display device of the head-mounted device, and then predict the photographing effect and collision risk. By displaying the image sent back from the unmanned aerial vehicle to the head-mounted device on the display device of the head-mounted device, that is, the image transmission screen, when the user wears the head-mounted device to control the flight of the unmanned aerial vehicle, the user may be able to control the movement direction of the unmanned aerial vehicle within his field of vision. The control may be more intuitive, and it may have a bird flying experience.

Exemplarily, that the head-mounted device displays the mark on the display device of the head-mounted device according to the control information of the unmanned aerial vehicle, may include that: according to the control information of the unmanned aerial vehicle and the display parameters of the display device, the head-mounted device calculates the pixel coordinates of the mark on the display device, to display the mark on the display device.

Exemplarily, when the magnitude of the attitude change of the unmanned aerial vehicle indicated by the control information of the unmanned aerial vehicle is larger, the distance that the mark displayed by the display device deviates from the preset position may be larger. Therefore, the mark displayed by the display device may be able to reflect the magnitude of the attitude change of the unmanned aerial vehicle, which is convenient for feeding back the flight direction of the unmanned aerial vehicle to the user.

Exemplarily, the display parameters may include the aspect ratio and resolution of the display device. Therefore, the display may be adapted to display devices of different specifications to more accurately indicate the flight direction of the unmanned aerial vehicle.

In some embodiments, the photographing device may be installed on the unmanned aerial vehicle through a gimbal. According to the attitude information of the handheld control device, the attitude of the unmanned aerial vehicle and/or the gimbal may be adjusted, such that the photographing direction of the photographing device may be adjusted and the user may be able to observe the scene corresponding to the photographing direction on the display device of the head-mounted device.

Exemplarily, the gimbal mounted on the unmanned aerial vehicle may also rotate following the adjustment of the attitude of the handheld control device, such that the flight direction of the unmanned aerial vehicle and the mark displayed by the display device are located in the field of view of the head-mounted device.

In some implementations, the control information sent to the head-mounted device may include control information in the earth coordinate system, the body coordinate system of the unmanned aerial vehicle, or the gimbal coordinate system, such that the head-mounted device maps the control information to control information in the camera coordinate system of the photographing device, and display the mark according to the control information in the camera coordinate system.

Exemplarily, the method may further include: sending the position and direction of the unmanned aerial vehicle, the relative position and attitude between the unmanned aerial vehicle and the gimbal, and/or the relative position and attitude between the gimbal and the photographing device, to the head-mounted device, such that the head-mounted device maps the control information in the earth coordinate system, the body coordinate system of the unmanned aerial vehicle, or the gimbal coordinate system, to control information in the camera coordinate system of the photographing device.

Exemplarily, mapping the control information in the earth coordinate system to the camera coordinate system of the photographing device may include: mapping the control information in the earth coordinate system to the body coordinate system of the unmanned aerial vehicle (according to the position and direction of the unmanned aerial vehicle), mapping the control information in the body coordinate system to the gimbal coordinate system (according to the relative position and attitude between the unmanned aerial vehicle and the gimbal, were the relative position may be fixed, and the attitude may be monitored and calculated by the sensor on the unmanned aerial vehicle and the gimbal), and mapping the control information in the gimbal coordinate system to the camera coordinate system (according to the relative position and attitude between the gimbal and the photographing device, the position can be fixed, and the attitude can be obtained from the gimbal control).

Exemplarily, the position and direction of the unmanned aerial vehicle, the relative position and attitude between the unmanned aerial vehicle and the gimbal, and the relative position and attitude between the gimbal and the photographing device may be sent by the unmanned aerial vehicle to the head-mounted device, such that the head-mounted device performs mapping of control information.

In some embodiments, the unmanned aerial vehicle may also directly transmit the control information in the camera coordinate system to the head-mounted device. Therefore, the position and direction of the unmanned aerial vehicle, the relative position and attitude of the unmanned aerial vehicle and the gimbal, and the relative position and attitude of the gimbal and the photographing device may not need to be transmitted.

Exemplarily, the control information of the unmanned aerial vehicle may include unmanned aerial vehicle attitude control information and/or gimbal attitude control information. Exemplarily, the control information of the unmanned aerial vehicle may be used to indicate the angle and/or angular speed of the attitude adjustment of the body and/or the gimbal of the unmanned aerial vehicle. For example, the control information of the unmanned aerial vehicle may be used to adjust the yaw angle of the body of the unmanned aerial vehicle or the angular speed of the body rotating in the yaw direction, or to adjust the pitch angle of the gimbal of the unmanned aerial vehicle or the angular speed of the rotation of the gimbal in the pitch direction. Of course, it is not limited to this.

In some embodiments, the yaw attitude of the unmanned aerial vehicle may be related to the yaw attitude and/or roll attitude of the handheld control device. The yaw attitude of the unmanned aerial vehicle may be used to adjust the flight direction of the unmanned aerial vehicle, and the handheld control device may adjust the flight direction of the unmanned aerial vehicle when the attitude is adjusted in the yaw direction and/or the roll direction.

Exemplarily, as shown in FIG. 5, when the handheld control device is turned left or right in the horizontal direction, the flight direction of the unmanned aerial vehicle follows the rotation of the handheld control device in the horizontal direction, for example, remains consistent with the X-axis direction of the handheld control device. When the mark displayed by the display device of the head-mounted device moves to the left or right, the direction of the photographing device changes accordingly, and the image information displayed by the display device of the head-mounted device also changes accordingly.

Exemplarily, as shown in FIG. 6, when the handheld control device is tilted to the left or right in the vertical direction, the flight direction of the unmanned aerial vehicle follows the vertical rotation of the handheld control device. For example, when the handheld control device tilts to the left in the vertical direction, the unmanned aerial vehicle rotates counterclockwise, and the mark displayed on the display device of the head-mounted device moves to the left. When the handheld control device tilts to the right in the vertical direction, the unmanned aerial vehicle rotates clockwise, and the mark displayed on the display device of the head-mounted device moves to the right. When the handheld control device is not tilted in the vertical direction, the unmanned aerial vehicle does not rotate in the horizontal direction.

Exemplarily, the control information of the unmanned aerial vehicle determined according to the yaw angle and/or the roll angle of the handheld control device may be used to move the mark to the left or to the right. The relationship between the moving direction of the mark and the attitude adjustment direction of the handheld control device may be more in line with the user's operating habits, and may be more intuitive and convenient.

Exemplarily, as shown in FIG. 8 and FIG. 9, the control information used to control the unmanned aerial vehicle and/or the gimbal of the unmanned aerial vehicle to turn left in the yaw direction is used to make the mark move to the left, and the control information used to control the unmanned aerial vehicle and/or the gimbal of the unmanned aerial vehicle to turn right in the yaw direction is used to move the mark move to the right. The moving direction of the mark may be able to better reflect the attitude adjustment direction of the unmanned aerial vehicle and/or the gimbal of the unmanned aerial vehicle, which is more in line with the user's operating habits and more intuitive.

In some embodiments, the pitch attitude of the gimbal may be related to the pitch attitude of the handheld control device.

In some embodiments, the gimbal may rotate in the pitch direction. The control information may include at least one of gimbal control information or unmanned aerial vehicle control information. Exemplarily, as shown in FIG. 10, when the handheld control device adjusts the attitude in the pitch direction, the gimbal control information is able to control the gimbal of the unmanned aerial vehicle to drive the camera to adjust the attitude in the pitch direction, and the mark displayed by the display device of the head-mounted device moves up or down, for example, moves to off-center positions in the vertical direction of the display device. Exemplarily, as shown in FIG. 8 and FIG. 9, when the handheld control device adjusts its attitude in the yaw direction and/or roll direction, the unmanned aerial vehicle drives the photographing device to adjust its attitude in the yaw direction and/or roll direction, and the mark displayed by the display device of the head-mounted device moves to the left or right, for example, moves to off-center positions in the lateral direction of the display device.

In some other embodiments, the gimbal may be able to rotate in the pitch direction, the roll direction, and the yaw direction.

Exemplarily, the gimbal may have a corresponding limit range when it rotates in the pitch direction, the roll direction, and the yaw direction.

Exemplarily, when the rotation angle of the unmanned aerial vehicle determined according to the attitude information is within the limit range of the gimbal, the control information may be used to control the unmanned aerial vehicle to adjust the attitude of the gimbal.

Exemplarily, if the rotation angle corresponding to the control information of the unmanned aerial vehicle is within the limit range of the gimbal, the control information may include the gimbal control information. Exemplarily, if the rotation angle corresponding to the control information of the unmanned aerial vehicle is within the limit range of the gimbal, when the handheld control device adjusts the attitude in the pitch direction, the gimbal of the unmanned aerial vehicle may drive the photographing device to adjust the attitude in the pitch direction, and the mark displayed on the display device of the head-mounted device may move up or down. When the handheld control device adjusts the attitude in the yaw direction and/or the roll direction, the gimbal of the unmanned aerial vehicle may drive the photographing device to adjust the attitude in the yaw direction, and the mark displayed on the display device of the head-mounted device may move left or right. Exemplarily, when the rotation angle corresponding to the control information of the unmanned aerial vehicle is within the limit range of the gimbal, and the attitude of the handheld control device is adjusted in the roll direction and the attitude is not adjusted in the yaw direction, the gimbal of the unmanned aerial vehicle may drive the photographing device to adjust attitude in the roll direction, and the mark displayed by the display device of the head-mounted device may not move to the left or to the right.

Exemplarily, when the rotation angle of the unmanned aerial vehicle determined according to the attitude information is outside the limit range of the gimbal, the control information may be used to control the unmanned aerial vehicle to adjust the attitude of the gimbal and the attitude of of the body of the unmanned aerial vehicle.

Exemplarily, if the rotation angle corresponding to the control information of the unmanned aerial vehicle is outside the limit range of the gimbal, the control information may also include unmanned aerial vehicle control information. Exemplarily, a portion of the rotation angle corresponding to the control information of the unmanned aerial vehicle outside the limit range of the gimbal may be used to control the unmanned aerial vehicle to adjust its attitude. For example, when the handheld control device adjusts the attitude in the yaw direction and/or roll direction such that the rotation angle in the yaw direction corresponding to the control information exceeds the limit range of the gimbal in the yaw direction, the control information may also control the body of the unmanned aerial vehicle to adjust the attitude in the yaw direction, and the mark displayed on the display device of the head-mounted device may move left or right.

Exemplarily, as shown in FIG. 10, the control information of the unmanned aerial vehicle determined according to the pitch angle of the handheld control device may be used to make the mark move up or down. The relationship between the moving direction of the mark and the attitude adjustment direction of the handheld control device is more in line with the user's operating habits, and more intuitive and convenient.

Exemplarily, as shown in FIG. 10, the control information used to control the unmanned aerial vehicle and/or the gimbal of the unmanned aerial vehicle to rotate upward in the pitch direction is used to make the mark move upwards, and the control information used to control the unmanned aerial vehicle and/or the gimbal of the unmanned aerial vehicle to rotate downwards in the pitch direction is used to make the mark move downwards. The moving direction of the mark may be able to better reflect the attitude adjustment direction of the unmanned aerial vehicle and/or the gimbal of the unmanned aerial vehicle, which is more in line with the user's operating habits and more intuitive.

In some embodiments, determining the control information of the unmanned aerial vehicle according to the attitude information of the handheld control device may include: obtaining reference attitude information of the handheld control device, and determining the control information of the unmanned aerial vehicle according to the attitude information of the handheld control device information and the reference attitude information of the handheld control device.

Exemplarily, the attitude corresponding to the reference attitude information of the handheld control device may be the initial attitude of the handheld control device, or may be referred to as the zero position of the handheld control device.

In some embodiments, the control information of the unmanned aerial vehicle may be determined according to the difference between the current attitude of the handheld control device and the initial attitude of the handheld control device. That is, the control information of the unmanned aerial vehicle may be determined according to the relative attitude of the handheld control device relative to the initial attitude. For example, the relative quaternion is determined according to the current rotation quaternion and the rotation quaternion corresponding to the initial attitude of the handheld control device. The relative quaternions may be mapped to any desired rotation system, such as Euler angles, and the rotation sequence may be adjusted according to different needs.

Exemplarily, the initial attitude of the handheld control device may be a preset attitude, for example, the attitude of the handheld control device when the user naturally holds the handheld control device. Or the current attitude of the handheld control device may be initialized and determined as the initial attitude of the handheld control device at a certain moment.

In some embodiments, obtaining the reference attitude information of the handheld control device may include: using the attitude information of the handheld control device when an initialization operation is triggered as the reference attitude information of the handheld control device.

Exemplarily, when the initialization operation is performed, the current attitude of the handheld control device may be determined as the initial attitude of the handheld control device.

Exemplarily, the initialization operation may be triggered by a user. For example, the user may trigger (for example, press a corresponding button on the handheld control device) at any time and any position on the handheld control device to determine the reference attitude information of the handheld control device according to the current attitude of the handheld control device. For example, the user presses the emergency stop button on the handheld control device to stop the unmanned aerial vehicle from flying and keep hovering. When the user presses the emergency stop button again to enable the unmanned aerial vehicle to fly, the handheld control device determines the reference attitude information of the holding control device according to the current attitude.

Exemplarily, the initialization operation may be automatically triggered when the unmanned aerial vehicle automatically takes off.

Exemplarily, the initialization operation may also be triggered by the flight state of the unmanned aerial vehicle. For example, when the unmanned aerial vehicle is hovering at a preset height from takeoff, the reference attitude information of the handheld control device may be determined according to the current attitude of the handheld control device. It may prevent the unmanned aerial vehicle from malfunctioning when the initial attitude of the handheld control device is not initialized.

Exemplarily, the initialization operation may also be triggered by the state of the communication connection between the handheld control device and the unmanned aerial vehicle. For example, when the handheld control device communicates with the unmanned aerial vehicle for a preset period of time, the reference attitude information of the handheld control device may be determined according to the current attitude of the handheld control device, to prevent the unmanned aerial vehicle from malfunctioning when the initial attitude of the handheld control device is not initialized. Of course, it is not limited to this.

Exemplarily, if the attitude information of the handheld control device when the initialization operation is triggered satisfies a preset condition, the attitude information of the handheld control device when the initialization operation is triggered may be used as the reference attitude information of the handheld control device, and the attitude information of the unmanned aerial vehicle when the initialization operation is triggered may be used as the reference attitude information of the unmanned aerial vehicle.

Exemplarily, when the current attitude of the handheld control device is within a preset range, the initial attitude of the handheld control device may be enabled. For example, when the current yaw angle, roll angle, and pitch angle of the handheld control device are within the corresponding preset range, if the initialization operation is triggered, the attitude information of the unmanned aerial vehicle when the initialization operation is triggered may be used as the reference attitude information of the unmanned aerial vehicle. It can prevent the user from defining an abnormal attitude as the zero position of the handheld control device, that is, the initial attitude, which is not conducive to the subsequent control of the flight direction of the unmanned aerial vehicle by adjusting the attitude of the attitude control device.

Exemplarily, when the attitude information of the handheld control device does not satisfy a preset condition when the initialization operation is triggered, prompt information may be output to prompt the user to adjust the attitude of the handheld control device. For example, when the current yaw angle, roll angle or pitch angle of the handheld control device is not within the corresponding preset range, prompt information may be output.

Exemplarily, when the current attitude of the handheld control device is not within the preset range, if a user's initialization trigger operation is detected, prompt information may be output. The prompt information may be used to prompt that the initial attitude of the handheld control device cannot be initialized currently and/or prompt to adjust the current attitude of the handheld control device.

Exemplarily, the reference pitch angle and the reference roll angle of the handheld control device may be preset values. That is, the zero position of the handheld control device in the roll direction and the zero position in the pitch direction may be preset values, for example, the angle of the handheld control device in the roll direction and the angle in the pitch direction when the user naturally holds the handheld control device. It can prevent the user from operating the handheld control device in an abnormal attitude during the unmanned aerial vehicle's take-off to hovering process (such as deflecting 90 degrees in the roll direction) such that the reference pitch angle and reference roll angle are too large. When the user holds the handheld control device horizontally, that is, when the handheld control device is naturally held, the unmanned aerial vehicle may be prevented from rotating abnormally in the roll direction and the pitch direction.

Exemplarily, when the current attitude of the handheld control device is the attitude corresponding to the reference attitude information of the handheld control device, the mark may be displayed at a preset position on the display interface of the display device. For example, the preset position is located in the middle of the display interface. The mark displayed on the display device may more accurately indicate the flight direction of the unmanned aerial vehicle.

Exemplarily, when the yaw angle and/or roll angle of the handheld control device is zero and the pitch angle is zero, the mark may be displayed at the preset position on the display interface of the display device.

In some embodiments, the target angular speed for attitude adjustment of the unmanned aerial vehicle may be determined according to the attitude information of the handheld control device. In this embodiment, the reference attitude of the unmanned aerial vehicle, that is, the initial attitude of the unmanned aerial vehicle, may not be determined, and the attitude of the unmanned aerial vehicle may be adjusted according to the target angular speed.

Exemplarily, according to at least one of the yaw angle, the pitch angle, or the roll angle of the handheld control device, the target angular speed for attitude adjustment of the unmanned aerial vehicle in the corresponding direction may be determined.

For example, the yaw angular speed of the unmanned aerial vehicle rotating in the yaw direction, that is, the target yaw angular speed of the unmanned aerial vehicle, may be determined according to the yaw angle of the handheld control device with respect to the initial attitude, such as $\epsilon$. This manner may be called the first manner.

Exemplarily, determining the control information of the unmanned aerial vehicle according to the attitude information of the handheld control device and the reference attitude information of the handheld control device may include: according to the yaw angle of the handheld control device and the reference yaw angle of the handheld control device, determining the target yaw angular speed of the unmanned aerial vehicle. For example, the yaw angular speed of the unmanned aerial vehicle is determined according to the angle between the current X-axis direction of the handheld control device and the X0Z plane of the initial attitude. When the handheld control device generates a certain yaw angle relative to the initial state, the unmanned aerial vehicle may be controlled to rotate in the yaw direction. For example, the yaw angular speed of the unmanned aerial vehicle rotating in the yaw direction is the product of the yaw angle $\epsilon$ and the yaw angular speed gain s of the unmanned aerial vehicle.

For example, the yaw angular speed of the unmanned aerial vehicle rotating in the yaw direction, that is, the target yaw angular speed of the unmanned aerial vehicle, may be determined according to the roll angle of the handheld control device with respect to the initial attitude, such as $\theta$. This manner may be called the second manner.

Exemplarily, determining the control information of the unmanned aerial vehicle according to the attitude information of the handheld control device and the reference attitude information of the handheld control device may include: according to the roll angle of the handheld control device and the reference roll angle of the handheld control device, determining the target yaw angular speed of the unmanned aerial vehicle. For example, when the handheld control device generates a certain roll angle relative to the initial state, the unmanned aerial vehicle may be controlled to rotate in the yaw direction. For example, the yaw angular speed of the unmanned aerial vehicle rotating in the yaw direction may be determined according to the product of the roll angle $\theta$ and the yaw angular speed gain s of the unmanned aerial vehicle. During the forward flight process of the unmanned aerial vehicle in the body coordinate system, there may be the yaw angular speed and the forward speed of the body in the positive direction, and then forward flight, turning and so on may be realized.

In some other embodiment, the angle at which the unmanned aerial vehicle performs attitude adjustment may be determined according to the attitude information of the handheld control device.

Exemplarily, according to at least one of the yaw angle, pitch angle, or roll angle of the handheld control device, the angle at which the unmanned aerial vehicle performs attitude adjustment in the corresponding direction may be determined.

For example, the yaw angle of the unmanned aerial vehicle rotating in the yaw direction, that is, the target yaw angle of the unmanned aerial vehicle, may be determined according to the yaw angle of the handheld control device relative to the initial attitude, such as ε. This manner may be called the third manner.

Exemplarily, determining the control information of the unmanned aerial vehicle according to the attitude information of the handheld control device and the reference attitude information of the handheld control device may include: determining the target yaw angle of the unmanned aerial vehicle, according to the yaw angle of the handheld control device and the reference yaw angle of the handheld control device.

For example, the yaw angle of the unmanned aerial vehicle rotating in the yaw direction is determined according to the angle between the current X-axis direction of the handheld control device and the X0Z plane of the initial attitude. When the handheld control device generates a certain yaw angle relative to the initial state, the unmanned aerial vehicle may be controlled to rotate in the yaw direction. For example, the yaw angular of the unmanned aerial vehicle rotating in the yaw direction is determined according to the yaw angle ε.

For example, the yaw angle of the unmanned aerial vehicle rotating in the yaw direction, that is, the target yaw angle of the unmanned aerial vehicle, may be determined according to the roll angle of the handheld control device with respect to the initial attitude, such as θ. This method may be called the fourth method.

Exemplarily, determining the control information of the unmanned aerial vehicle according to the attitude information of the handheld control device and the reference attitude information of the handheld control device may include: according to the roll angle of the handheld control device and the reference roll angle of the handheld control device, determining the target yaw angle of the unmanned aerial vehicle. For example, when the handheld control device generates a certain roll angle relative to the initial state, the unmanned aerial vehicle may be controlled to rotate in the yaw direction. For example, the yaw angle of the unmanned aerial vehicle rotating in the yaw direction may be determined according to the roll angle θ of the unmanned aerial vehicle.

During the forward flight process of the unmanned aerial vehicle in the body coordinate system, there may be the yaw angular speed and the forward speed of the body in the positive direction, and then forward flight, turning and so on may be realized.

In some other embodiments, the angle and the angular speed for attitude adjustment of the unmanned aerial vehicle may be determined according to the attitude information of the handheld control device.

For example, the yaw angle of the unmanned aerial vehicle rotating in the yaw direction, that is, the target yaw angle of the unmanned aerial vehicle, may be determined according to the yaw angle of the handheld control device with respect to the initial attitude, and the yaw angular speed of the unmanned aerial vehicle rotating in the yaw direction, that is, the target yaw angular speed of the unmanned aerial vehicle, may be determined according to the roll angle of the handheld control device with respect to the initial attitude. This method may be called the fifth method.

Exemplarily, determining the control information of the unmanned aerial vehicle according to the attitude information of the handheld control device and the reference attitude information of the handheld control device may include: determining the target yaw angle of the unmanned aerial vehicle according to the yaw angle of the handheld control device and the reference yaw angle of the handheld control device, and determining the target yaw angular speed of the unmanned aerial vehicle according to the roll angle of the handheld control device and the reference roll angle of the handheld control device.

By defining a variety of mapping methods between the attitude information of the handheld control device and the control information of the unmanned aerial vehicle, the mapping method may be determined according to the user's body structure and hand habits, such that it may be easier for people with different body structures and hand habits to control the unmanned aerial vehicle with the handheld control device.

Exemplarily, the first manner and the third manner are more in line with the definition of the flashlight mode. A user may be able to imagine in their mind that they actually use the flashlight to emit light to guide the unmanned aerial vehicle to fly. Since the left and right are not symmetrical sometimes when the human wrist is operating the handheld control device to rotate in the yaw angle, some people may not be comfortable with the methods. In the second and fourth methods, the user may be able to control the unmanned aerial vehicle to turn by turning the small arm, which is relatively labor-saving. The fifth method may determine the target yaw angle and target yaw angular speed of the unmanned aerial vehicle, to realize the movement of the unmanned aerial vehicle following the user's body rotation. When the user rotates the body, the arm may also be rotated to continue to control the rotation of the unmanned aerial vehicle in the yaw direction to realize large maneuvering flight.

Exemplarily, the yaw angle of the unmanned aerial vehicle may be determined according to the yaw angle of the handheld control device with respect to the initial attitude. For example, the yaw angle of the unmanned aerial vehicle may be determined according to the angle between the current X-axis direction of the handheld control device and the X0Z plane of the initial attitude. The yaw angular speed of the unmanned aerial vehicle may be determined according to the roll angle of the handheld control device with respect to the initial attitude. When the handheld control device generates a certain roll angle relative to the initial state, the unmanned aerial vehicle may be controlled to rotate in the yaw direction at the yaw angular speed.

Exemplarily, the attitude of the unmanned aerial vehicle may be adjusted according to the target yaw angle of the unmanned aerial vehicle and the target yaw angular speed of the unmanned aerial vehicle.

Exemplarily, the method may further include: controlling the unmanned aerial vehicle to continue to rotate at the target yaw angular speed after rotating at the target yaw angle. For example, the unmanned aerial vehicle may be controlled to rotate in the yaw direction at the yaw angle of the unmanned aerial vehicle according to the yaw angle of the handheld control device, and the unmanned aerial vehicle may be controlled to continue rotating at the yaw angular speed of the unmanned aerial vehicle in the yaw direction determined by the roll angle of the handheld control device.

Exemplarily, the method may further include: controlling the unmanned aerial vehicle to rotate by at least the target yaw angle at the target yaw angular speed. For example, the unmanned aerial vehicle may be controlled to rotate by the yaw angle of the unmanned aerial vehicle determined according to the yaw angle of the handheld control device, and the angular speed in the yaw direction at which the unmanned aerial vehicle rotates may be the yaw angular speed of the unmanned aerial vehicle determined according to the roll angle of the handheld control device.

In some embodiments, the method may further include: determining the control angle of the unmanned aerial vehicle in the yaw direction according to the integral of the target yaw angle and the target yaw angular speed over a preset time interval. For example, the control angle may be calculated by the following formula:

$$Yaw_{unmanned\ aerial\ vehicle}(t) = Yaw_{rc}(t) - Yaw_{rc}(0) + Yaw_{unmanned\ aerial\ vehicle}(0) + \int_0^t w(\tau)d\tau.$$

Exemplarily, the target yaw angle may be determined according to:

$$Yaw_{rc}(t) - Yaw_{rc}(0),$$

where $Yaw_{rc}(0)$ represents the yaw angle during the initial attitude of the handheld control device, that is, the reference yaw angle, t represents the current time when the time triggered by the initialization operation is zero, and $Yaw_{rc}(t)$ represents the current yaw angle of the handheld control device, which is the current yaw angle.

The integral of the target yaw angular speed over the preset time interval t may be expressed as:

$$\int_0^t w(\tau)d\tau$$

where $\tau$ is the time period between 0 and time t, $w(\tau)$ represents the target yaw angular speed at time $\tau$. For example, the target yaw angular speed may be determined according to the difference between the roll angle of the handheld control device at time $\tau$ and the reference roll angle. For example, the yaw angular speed of the unmanned aerial vehicle rotating in the yaw direction, that is, the target yaw angular speed, may be determined according to the product of this difference and the yaw angular speed gain s of the unmanned aerial vehicle.

Exemplarily, the control angle of the unmanned aerial vehicle in the yaw direction may be determined according to the sum of the integral of the target yaw angle and the target yaw angular speed over a preset time interval t.

Exemplarily, the yaw angle of the unmanned aerial vehicle at the initial attitude may be expressed as $Yaw_{unmanned\ aerial\ vehicle}(0)$.

In some embodiments, determining the control information of the unmanned aerial vehicle according to the attitude information of the handheld control device and the reference attitude information of the handheld control device may include: obtaining the reference attitude information of the unmanned aerial vehicle, and determining the control information of the unmanned aerial vehicle according to the attitude information of the handheld control device, the reference attitude information of the handheld control device, and the reference attitude information of the unmanned aerial vehicle.

Exemplarily, the control information of the unmanned aerial vehicle may be used to control the attitude angle of the unmanned aerial vehicle relative to the initial attitude. The initial attitude may be an attitude corresponding to the reference attitude information. In other examples, the control information of the unmanned aerial vehicle may be used to control the rotation angle of the unmanned aerial vehicle relative to the previous moment.

Exemplarily, when the current attitude of the unmanned aerial vehicle is the attitude corresponding to the reference attitude information of the unmanned aerial vehicle, the mark may be displayed at a preset position on the display interface of the display device. For example, the preset position may be located in the middle of the display interface. The mark displayed on the display device may be able to more accurately indicate the flight direction of the unmanned aerial vehicle.

Exemplarily, the initial attitude of the unmanned aerial vehicle may be a preset attitude, for example, the attitude when the unmanned aerial vehicle is hovering. In some other embodiment, the current attitude of the unmanned aerial vehicle at a certain moment may be initialized and determined as the initial attitude of the unmanned aerial vehicle.

In some embodiments, obtaining the reference attitude information of the handheld control device and the reference attitude information of the unmanned aerial vehicle may include: using the attitude information of the handheld control device when an initialization operation is triggered as the reference attitude information of the handheld control device, and using the attitude information of the unmanned aerial vehicle when the initialization operation is triggered as the reference attitude information of the unmanned aerial vehicle.

Exemplarily, the initialization operation may be triggered by a user, or the initialization operation may be automatically triggered when the unmanned aerial vehicle automatically takes off. The present disclosure has no limit on this.

Exemplarily, if the attitude information of the handheld control device when the initialization operation is triggered satisfies a preset condition, the attitude information of the handheld control device when the initialization operation is triggered may be used as the reference attitude information of the handheld control device, and the attitude information of the unmanned aerial vehicle when the initialization operation is triggered may be used as the reference attitude information of the unmanned aerial vehicle. It may prevent the user from defining an abnormal attitude as the zero position of the handheld control device, that is, the initial attitude, which is not conducive to the subsequent control of the flight direction of the unmanned aerial vehicle by adjusting the attitude of the attitude control device. Exemplarily, when the attitude information of the handheld control device does not satisfy the preset condition when the initialization operation is triggered, prompt information may be output to prompt the user to adjust the attitude of the handheld control device.

Exemplarily, the reference roll angle and the reference pitch angle of the unmanned aerial vehicle may be preset values, that is, the zero position of the unmanned aerial vehicle in the roll direction and the zero position in the pitch direction are preset values, for example, the angle in the roll direction and the angle in the pitch direction when the unmanned aerial vehicle hovers horizontally, such that the unmanned aerial vehicle remains stable.

Exemplarily, the yaw angle of the handheld control device when the initialization operation is triggered can be used as the reference yaw angle of the handheld control device, and the yaw angle of the unmanned aerial vehicle when the initialization operation is triggered can be used as the reference yaw angle of the handheld control device. The reference yaw angle of the man-machine. By initializing the reference yaw angle of the unmanned aerial vehicle, the zero position of the heading of the unmanned aerial vehicle can be determined, which is convenient for the user to accurately adjust the heading of the unmanned aerial vehicle by operating the handheld control device.

In some embodiments, determining the control information of the unmanned aerial vehicle according to the attitude information of the handheld control device and the reference attitude information of the handheld control device may include: according to the pitch angle of the handheld control device and the reference pitch angle of the handheld control device, determining the target pitch angle of the gimbal.

Exemplarily, when the handheld control device adjusts its attitude in the yaw direction and/or the roll direction, the body of the unmanned aerial vehicle may adjust its attitude in the yaw direction, and the mark displayed on the display device of the head-mounted device may move left or right. When the handheld control device adjusts its attitude in the pitch direction, the gimbal of the unmanned aerial vehicle may adjust the attitude in the pitch direction, and the mark displayed on the display device of the head-mounted device may move up or down. It may prevent the risk caused by large movements of the unmanned aerial vehicle's body in the pitch direction.

Exemplarily, if the rotation angle of the unmanned aerial vehicle in the pitch direction determined according to the attitude information is within the limit range of the gimbal in the pitch direction, the control information may be used to control the unmanned aerial vehicle to adjust the attitude of the gimbal in the pitch direction. Exemplarily, if the rotation angle of the unmanned aerial vehicle in the Pitch direction determined according to the attitude information exceeds the limit range of the gimbal in the pitch direction, the control information may be used to control the unmanned aerial vehicle to adjust the attitude of the gimbal in the itch direction and adjust the attitude of the body of the unmanned aerial vehicle in the pitch direction.

Figure 11:
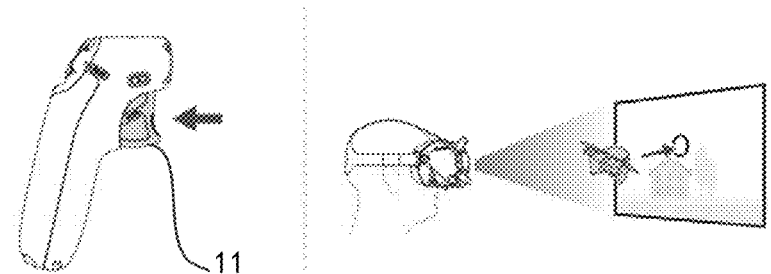
FIG. 11 is a schematic diagram showing controlling the unmanned aerial vehicle to fly toward a flight direction labelled by a label consistent with the present disclosure.

In some embodiments, as shown in FIG. 3 and FIG. 11, handheld control device includes an accelerator device 11. The accelerator device includes, for example, a manipulable accelerator. The position of the accelerator, that is, the value of the key stroke, or the accelerator control value, may be able to control the value (scalar) of the speed of the unmanned aerial vehicle in the body coordinate system. As shown in FIG. 11, pressing the accelerator in the direction shown in the figure may control the unmanned aerial vehicle to move along the flight direction.

Exemplarily, the method may further include: obtaining the accelerator control value, where the accelerator control value may be generated based on the operation of the accelerator device, and controlling the unmanned aerial vehicle to move towards the flight direction indicated by the mark according to the accelerator control value.

In some embodiments, the key stroke value of the accelerator may be mapped to [0,1]. Supposing that the maximum speed of the unmanned aerial vehicle is $V_{max}$, the magnitude of the speed of the unmanned aerial vehicle in the speed direction may be the product of the value after the key stroke value is mapped and the maximum speed $V_{max}$ of the unmanned aerial vehicle.

Exemplarily, when the accelerator control value is the minimum accelerator control value, the position of the unmanned aerial vehicle may remain unchanged. Exemplarily, when the accelerator is fully released, the key stroke value after mapping may be 0, and the corresponding accelerator control value may be the minimum accelerator control value. Correspondingly, the unmanned aerial vehicle may stop moving in the horizontal direction and/or the value after the key stroke value mapping vertical direction, for example, keep hovering or rotate in place according to the attitude information of the handheld control device to adjust the flight direction. It is not necessary to manually control the accelerator control value to keep the unmanned aerial vehicle hovering.

As the accelerator control value gradually increases, when the value after the key stroke value mapping is larger than 0, the unmanned aerial vehicle may start to gradually accelerate to the flight direction determined according to the attitude information of the handheld control device, for example, accelerate to the product of the value after the key-range value mapping and the maximum speed of the unmanned aerial vehicle $V_{max}$.

Exemplarily, when the accelerator control value is the maximum accelerator control value, the unmanned aerial vehicle may fly towards the flight direction indicated by the mark at a preset flight speed (or in general the movable object may move towards the moving direction indicated by the mark at a preset moving speed). When the accelerator is pressed to the bottom, the mapped value of the key-stroke value may be 1, and the unmanned aerial vehicle may fly at full speed, such as at the maximum speed $V_{max}$, in the flight direction indicated by the mark.

In some other embodiments, the key stroke value of the accelerator may be mapped to [−1,1]. When the accelerator is maintained at the middle position, the value of the key stroke value after mapping may be 0, and the unmanned aerial vehicle may stop in the horizontal direction and/or in the vertical direction, such as may keep hovering or rotating in situ. When the accelerator is released from the middle position, the value after the key-stroke value mapping may be less than 0, and the unmanned aerial vehicle may move downward in the vertical direction. When the accelerator is pressed from the middle position, the mapped value of the key stroke value may be larger than 0, and the unmanned aerial vehicle may move upward in the vertical direction. This method may require manually keeping the unmanned aerial vehicle hovering.

Exemplarily, the noise and vibration of the accelerator control value may be removed by filtering the key stroke value of the accelerator, and the key stroke value of the accelerator may be filtered by first-order filtering.

In some embodiments, when the accelerator control value changes uniformly from the minimum accelerator control value to the maximum accelerator control value, the increment of the flight speed of the unmanned aerial vehicle may gradually increase.

Exemplarily, by processing the key stroke value of the accelerator through a preset exponential curve, the front key stroke (such as the accelerator being between the middle position and fully released) may be relatively smooth, to achieve smooth acceleration, and the rear key stroke (such as the accelerator being between the middle position and fully pressed) may make the unmanned aerial vehicle have a faster response, to improve the feel of accelerator control.

In some embodiments, the movement of the unmanned aerial vehicle may be decomposed into the angle of rotation in the yaw direction, the magnitude of the horizontal speed |v| in the positive direction of the body, and/or the speed in the vertical direction. When the X-axis direction of the coordinate system of the handheld control device, that is, the light emitted by the "flashlight", changes in the horizontal direction (rotates along the Z-axis of the earth coordinate system), the movement of the unmanned aerial vehicle may be decomposed into the rotation angle in the yaw direction and the horizontal speed |v| in the positive direction of the body. When the X-axis direction of the handheld control device, that is, the light emitted by the "flashlight" changes in the vertical direction (rotates along the Y-axis of the earth coordinate system), the unmanned aerial vehicle may generate a speed in the vertical direction.

Exemplarily, the target speed direction of the unmanned aerial vehicle may be determined according to a preset direction on the body coordinate system of the handheld control device, such as the X-axis direction. When the attitude of the handheld control device changes, such as when the user turns the handheld control device, the X-axis direction may rotate together. Following the X-axis direction, at least one of the speed of the body of the handheld control device in the horizontal direction or the speed in the vertical direction, the yaw angle, the yaw angular speed may be obtained by decomposing. Therefore, the attitude information of the handheld control device may include at least one of the speed of the body of the handheld control device in the horizontal direction, the speed of the body of the handheld control device in the vertical direction, the yaw angle, or the yaw angular speed. For example, the control information for controlling the rotation of the unmanned aerial vehicle in the horizontal direction may be determined according to the yaw angle and yaw angular speed of the handheld control device in the horizontal direction.

Exemplarily, the current X-axis direction of the handheld control device may be mapped to the XOZ plane of the initial attitude to obtain a vector. And, according to this vector, the movement direction of the unmanned aerial vehicle in the body coordinate system may be determined, and the movement direction may be called is the direction of the speed command vector, referred to as the speed command direction.

In some embodiments, when the deviation between the pitch angle of the handheld control device and the reference pitch angle of the handheld control device is larger than a preset threshold, the mark may be used to instruct the unmanned aerial vehicle to vertically ascend and descend.

Exemplarily, when the deviation between the pitch angle of the handheld control device and the reference pitch angle of the handheld control device is larger than the preset threshold, the control information of the unmanned aerial vehicle determined according to the attitude information may be used to control the unmanned aerial vehicle to ascend or descend, for example, control the speed of the motor to increase the lift of the unmanned aerial vehicle or control the speed of the motor to decrease the lift of the unmanned aerial vehicle. The risk caused by the large rotation of the unmanned aerial vehicle in the direction of the pitch direction may be avoided.

Exemplarily, there may be an upward icon and a downward icon directly above and directly below the display device of the head-mounted device. When the deviation between the pitch angle of the handheld control device and the reference pitch angle of the handheld control device is larger than the preset threshold, the mark displayed by the display device may overlap with the upward icon or the downward icon, and the color of the upward icon or the downward icon may change after the coincidence, prompting the user that the current unmanned aerial vehicle may be lifted vertically. The user may operate the accelerator device, such as pull the accelerator to control the vertical lift of the unmanned aerial vehicle.

In some embodiments, the method may further include: when the unmanned aerial vehicle takes off to a preset height from the ground, enabling the control information of the unmanned aerial vehicle to be determined according to the attitude information of the handheld control device.

Exemplarily, the unmanned aerial vehicle may automatically take off vertically to hover in the air at 1.2 meters above the ground, and then the handheld control device may enter the flashlight mode. It may prevent false actions of the unmanned aerial vehicle caused by the attitude of the handheld control device when the user does not hold the handheld control device correctly or does not perform an initialization operation.

In some embodiments, the method may further include: when the unmanned aerial vehicle is in the automatic landing state, stopping determination of the control information of the unmanned aerial vehicle according to the attitude information of the handheld control device.

Exemplarily, when the power of the unmanned aerial vehicle is lower than a preset power threshold, the unmanned aerial vehicle may trigger an automatic landing with low power.

Exemplarily, when the unmanned aerial vehicle is in any position in the sky, the user may also trigger the automatic landing function by double-clicking a corresponding button on the handheld control device.

Exemplarily, when the unmanned aerial vehicle is in the state of automatic landing, the handheld control device may be locked, that is, the attitude change of the handheld control device may not cause the unmanned aerial vehicle attitude change, to improve the safety of automatic landing of unmanned aerial vehicles. The automatic landing function may be easy to operate, which reduces the difficulty of unmanned aerial vehicle landing in flashlight mode and improves the reliability of unmanned aerial vehicle landing safely.

In some embodiments, the method may further include: when the unmanned aerial vehicle is in the automatic landing state, according to the user's unlocking operation on the handheld control device, enabling the user to determine the control information of the unmanned aerial vehicle.

Exemplarily, when the unmanned aerial vehicle is in the state of automatic landing, if the obtained accelerator control value is larger than the preset accelerator control value threshold, determining the control information of the unmanned aerial vehicle according to the attitude information of the handheld control device may be enabled.

Exemplarily, when the unmanned aerial vehicle lands, the handheld control device may be unlocked by pressing down the accelerator, for example, by pressing the accelerator to the middle position or by continuing pressing the accelerator from the middle position, to take over the control of the unmanned aerial vehicle. That is, the attitude change of the handheld control device may be mapped as a change in the attitude of the unmanned aerial vehicle to start controlling the movement of the unmanned aerial vehicle. For example, the attitude adjustment of the handheld control device in the roll direction and/or the yaw direction may control the unmanned aerial vehicle to rotate in the yaw direction, and the rotation of the handheld control device in the pitch direction may control the pitch of the unmanned aerial vehicle's body and/or the unmanned aerial vehicle's gimbal.

Exemplarily, pressing the accelerator may slow down the unmanned aerial vehicle's descending speed. For example, when the accelerator is pulled to the bottom, the unmanned aerial vehicle may vertically hover. Exemplarily, when the accelerator is released back to the middle position or released from the middle position, the handheld control device may be locked, and the unmanned aerial vehicle may land autonomously.

Exemplarily, when the unmanned aerial vehicle lands, the unmanned aerial vehicle may descend vertically at a constant speed, hover at a place 0.3 meters above the ground, trigger a second-stage landing, and wait for the user to double-click the button to confirm the landing. During the landing process, the handheld control device may be operated, for example, the corresponding button on the handheld control device may be clicked to cancel the landing.

In some embodiments, when the unmanned aerial vehicle is landing, the flight direction and/or descent speed of the unmanned aerial vehicle may be adjusted through the handheld control device to ensure the safety of the landing, for example, to make the unmanned aerial vehicle landing in a place without obstacles.

Exemplarily, the speed of the unmanned aerial vehicle in the vertical direction may be determined according to the pitch angle of the handheld control device relative to the initial attitude. Exemplarily, a component of the unit vector of the current X axis direction of the handheld control device projected on the Z-axis of the earth coordinate system may be obtained, and this component may be multiplied by the speed V of the unmanned aerial vehicle controlled by the accelerator, to obtain the target speed in the vertical direction of the unmanned aerial vehicle.

Figure 12:
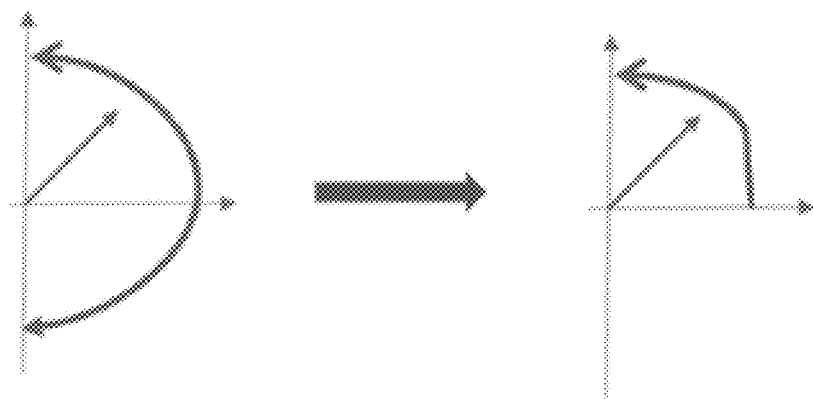
FIG. 12 is a schematic diagram showing a speed mapping when using the handheld control device to control the unmanned aerial vehicle consistent with the present disclosure.

Exemplarily, as shown in FIG. 12, when the unmanned aerial vehicle is controlled to fly according to the attitude information of the handheld control device, the target speed range of the unmanned aerial vehicle in the vertical direction determined according to the attitude of the handheld control device is $[-V_{max}, V_{max}]$. When the unmanned aerial vehicle automatically lands, if the handheld control device is unlocked and is able to control the movement of the unmanned aerial vehicle, the target speed range of the unmanned aerial vehicle in the vertical direction determined according to the attitude of the handheld control device may be $[0, V_{max}]$. It may ensure that the unmanned aerial vehicle is able to descend normally, and the handheld control device is able to be used to control the landing point of the unmanned aerial vehicle.

Exemplarily, when the unmanned aerial vehicle enters the landing process, the unmanned aerial vehicle's descent speed may be forced to be set to a preset value $V_{lan}$. When the target speed mapped to the vertical direction according to the attitude of the handheld control device offsets the descent speed $V_{lan}$, the unmanned aerial vehicle may stop descending.

In some embodiments, the method may further include: when the unmanned aerial vehicle is in the automatic landing state, controlling the gimbal to rotate upward or downward by a preset angle in the pitch direction. Therefore, the image information captured by the photographing device and the image information displayed by the display device of the head-mounted device may reflect the scenery below the unmanned aerial vehicle, which is convenient for the user to judge whether the unmanned aerial vehicle's landing point is safe and to control the flight direction or descending speed of the unmanned aerial vehicle by hand when there are obstacles at the landing point. The safety of the landing may be ensured, such as landing in a place without obstacles.

In some embodiments, the head-mounted device may obtain the attitude information of the handheld control device, and display the mark on the display device of the head-mounted device according to the attitude information of the handheld control device, and the mark may be used to indicate the flight direction of the unmanned aerial vehicle.

Exemplarily, the attitude of the handheld control device may be mapped to the adjustment of the display position of the mark. For example, when turning the handheld control device to the left or right in the horizontal direction, or tilting the handheld control device to the left or right in the vertical direction, the mark displayed on the display device of the head-mounted device may move to the left or right. When the handheld control device adjusts its attitude in the pitch direction, the mark displayed on the display device of the head-mounted device may move up or down.

Exemplarily, when the attitude adjustment range of the handheld control device is larger, the distance between the mark displayed by the display device and the preset position may be larger, and the attitude change magnitude of the unmanned aerial vehicle indicated by the control information of the unmanned aerial vehicle may be larger. Therefore, the mark displayed by the display device may reflect the attitude change magnitude of the unmanned aerial vehicle, which is convenient for feeding back the flight direction of the unmanned aerial vehicle to the user.

In some embodiments, the pixel coordinates of the mark on the display device may be calculated according to the attitude information of the handheld control device and the display parameters of the display device, to display the mark on the display device.

Exemplarily, the display parameters may include the aspect ratio and resolution of the display device. Therefore, the display may be able to be adapted to display devices of different specifications to more accurately indicate the flight direction of the unmanned aerial vehicle.

In some implementations, the mark displayed by the head-mounted device on the display device of the head-mounted device according to the control information of the unmanned aerial vehicle may be a flight instruction mark.

The method may further include: when the handheld control device is in a head-mounted device operation mode, sending attitude information of the handheld control device to the head-mounted device, such that the head-mounted device displays an operation mark on the display device of the head-mounted device according to the attitude information of the handheld control device. The operation mark may be used to operate a virtual control component on the display device.

In some embodiments, when the handheld control device is in the head-mounted device operation mode, the user may adjust the position of the operation mark on the display device by adjusting the attitude of the handheld control device, to realize the interface interaction of the display device, for example, to select a menu. For example, the user may use a single hand to hold the handheld control device to realize the menu selection of the display device. It can be understood that the attitude of the handheld control device may be mapped to the adjustment of the display position of the operation mark. For example, when turning the handheld control device to the left or right in the horizontal direction, or tilting the handheld control device to the left or right in the vertical direction, the operation mark displayed on the display device of the head-mounted device may move to the left or right. When the handheld control device adjusts its attitude in the Pitch direction, the operation mark displayed on the display device of the head-mounted device may move up or down. Exemplarily, when making settings or needing menu switching, the unmanned aerial vehicle may be set to hovering by one-key brake, and then the display position of the operation mark on the display device may be adjusted by adjusting the attitude of the handheld control device. Operations in the module interface, such as selecting the pull-down menu, selecting the virtual control component, or other operations may be achieved by the operation mark.

Exemplarily, buttons of the corresponding menu may be displayed on the screen of the head-mounted device. When the operation mark moves to a button, the button may change color to indicate that it is selected. At this time, pressing a corresponding key of the handheld control device, such as the mode key, may indicate confirmation, and double-clicking the corresponding key, such as the mode key may mean exiting the selection. After the menu is displayed, the user may control the operation mark and corresponding buttons to arbitrarily manipulate the option settings of the menu bar by adjusting the attitude of the handheld control device.

In some embodiments, obtaining the attitude information of the handheld control device may include: recording the yaw angle of the handheld control device as a locked yaw angle when the pitch angle of the handheld control device increases to a first threshold or decreases to a second threshold. The first threshold may be larger than the second threshold.

When the pitch angle of the handheld control device is larger than the first threshold or smaller than the second threshold, the locked yaw angle may be used as the current yaw angle of the handheld control device. And, according to an angle between the preset direction on the body coordinate system of the body and the second preset plane, the roll angle of the handheld control device may be determined. The second preset plane may be parallel to the preset direction when the handheld control device is at the locked yaw angle, and the second predetermined plane may be perpendicular to the earth plane.

Exemplarily, when the pitch angle of the handheld control device is too large or too small, the roll angle and the yaw angle of the handheld control device may be already coupled because of the limitation of the nature of Euler angles. Exemplarily, when the handheld control device has a large pitch angle, if a certain roll angle is given to the handheld control device at this time, the yaw angle may also have angle output which may easily lead to confusion in the control of the unmanned aerial vehicle. When the pitch angle of the handheld control device is larger or smaller than the corresponding thresholds, the yaw angle at this time may be recorded as the locked yaw angle. Afterwards, when the pitch angle is continuously increased or decreased, the locked yaw angle may remain unchanged. At this time, the output roll angle of the handheld control device may be replaced by the angle between the X-axis of the handheld control device and the vertical plane (the plane is perpendicular to the x0y plane of the earth) where the yaw angle is locked.

Figure 13:
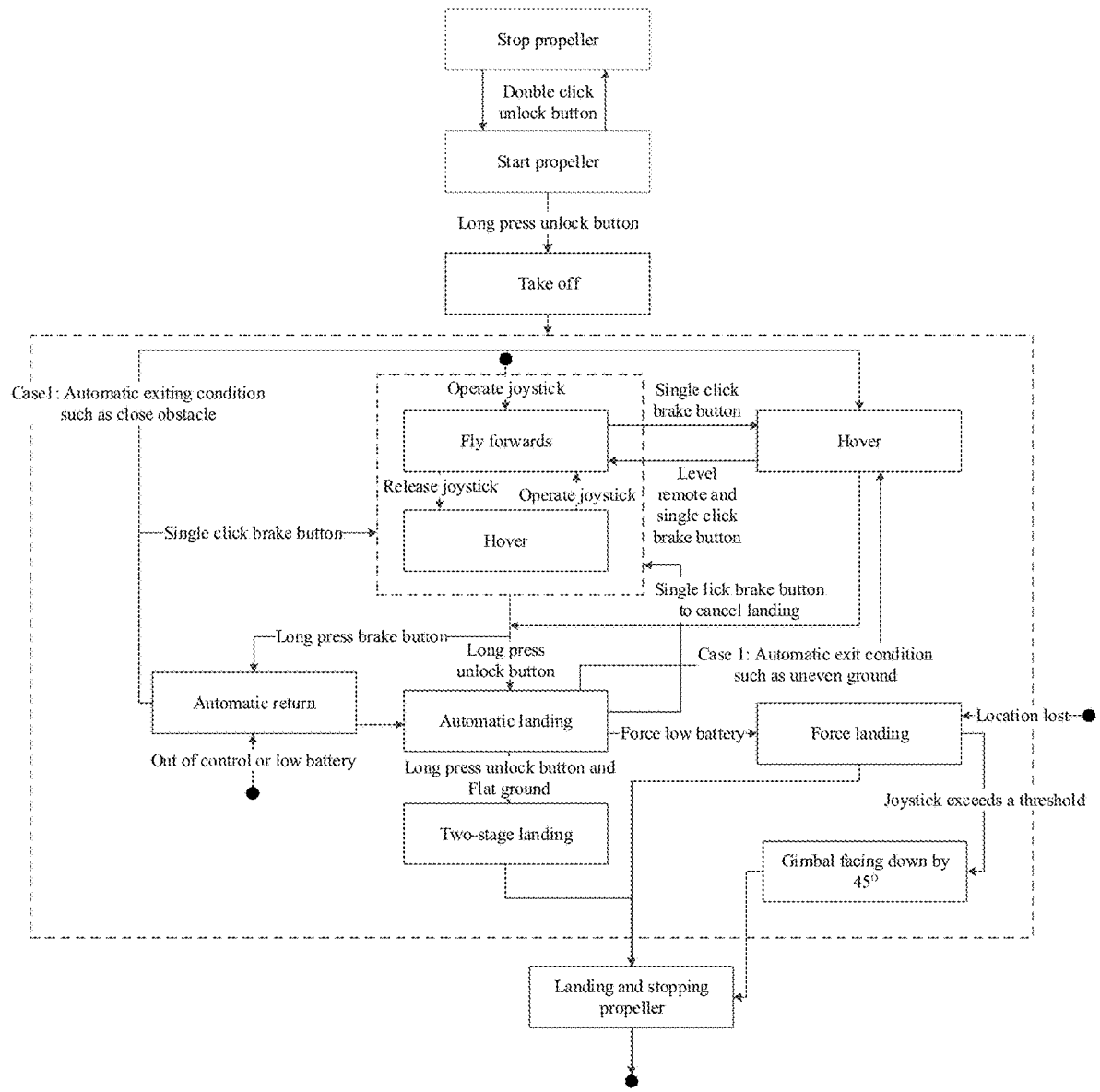
FIG. 13 is a schematic diagram showing a control process of the unmanned aerial vehicle consistent with the present disclosure.

As shown in FIG. 13 in combination with the aforementioned embodiments, the handheld control device may be able to realize at least one of the following functions: takeoff, entry, braking, return, landing, hovering, obstacle avoidance, division to points, APAS obstacle avoidance, or initialization at any angle.

When the unmanned aerial vehicle stops propeller, the unmanned aerial vehicle may be controlled to start propeller by double-clicking the unlock button. After that, the unmanned aerial vehicle may be controlled to take off by long pressing the unlock button.

Automatic take-off function: for example, after placing the unmanned aerial vehicle on a flat ground, turning on the battery of the unmanned aerial vehicle, and connecting the handheld control device, the unlock button on the handheld control device may be clicked and the unmanned aerial vehicle may start the propeller. Then the unlock button of the handheld control device may be pressed and hold, the unmanned aerial vehicle may automatically take off vertically and hover in the air 1.2 meters above the ground, and, for example, it may automatically enter the flashlight flight mode. By entering the flashlight flight mode after automatic takeoff, the unmanned aerial vehicle may be prevented from malfunctioning when the position of the handheld control device is not ready.

Automatic landing function. When the unmanned aerial vehicle is in any position in the air, the user may trigger the automatic landing function by long pressing the unlock button. After entering the automatic landing, the unmanned aerial vehicle may descend vertically at a constant speed, hover at a place 0.3 meters above the ground and trigger a second-stage landing. Then the unmanned aerial vehicle may wait for the user to confirm the landing by long pressing the unlock button. In the process of landing, the big circle button may be clicked to cancel the landing. The automatic landing function may be easy to operate, which reduces the difficulty of manual landing when flying in the flashlight mode and improves the reliability of the unmanned aerial vehicle's safe landing.

Automatic return function. When the unmanned aerial vehicle is in any position in the air, the user may press and hold the big round button, such as the brake button, to trigger the automatic return function. After entering automatic return function, the unmanned aerial vehicle may first rise to the return altitude and then cruise at a constant speed to return to the HOME point. During the return process, the big circle button may be clicked to cancel the return. When the battery of the unmanned aerial vehicle is insufficient, the low battery automatic return may be also triggered during the flight in the flashlight mode to ensure that the unmanned aerial vehicle is able to return safely. The automatic return function is easy to operate, which reduces the difficulty of manual return during the flight in the flashlight mode and improves the reliability of the unmanned aerial vehicle's safe return.

Braking and hovering function. The braking function in flashlight mode may be realized through two operations: 1) Releasing the accelerator during normal flight such that the unmanned aerial vehicle brakes normally, 2) Clicking the big circle button such that the unmanned aerial vehicle brakes in an emergency.

Normal flight function. After the unmanned aerial vehicle is connected to the handheld control device, it may enter the flashlight mode by default. After the unmanned aerial vehicle takes off automatically, the user may control the unmanned aerial vehicle to fly normally by manipulating the handheld control device. Manipulating the roll attitude and yaw attitude of the handheld control device may control the unmanned aerial vehicle to deflect the direction of the nose, manipulating the pitch attitude and accelerator of the handheld control device may control the unmanned aerial vehicle to move up and down, and manipulating the pitch attitude of the handheld control device may also control the up and down movement of the gimbal to ensure that the user's viewing angle in the head-mounted device conforms to the direction indicated by the handheld control device.

Obstacle avoidance flight function. During normal flight in the flashlight mode, the unmanned aerial vehicle may sense the obstacles in the environment, to plan and slow down the flight speed, such that the unmanned aerial vehicle is able to keep a safe distance from the obstacles and prevented from hitting obstacles and crowds. Therefore, the unmanned aerial vehicle and crowds may be safe.

APAS obstacle avoidance and circumvention function. During the flight in the flashlight mode, when the user chooses to turn on the APAS obstacle avoidance and circumvention function, the unmanned aerial vehicle may automatically plan a detour route when encountering obstacles, to avoid the obstacles and fly freely. The difficulty for the user to judge the safety of the flight environment may be reduced, to increase the user's enjoyment of flying in a complex environment.

Attitude initialization at any position function. The handheld control device may have no fixed return-to-center position and may be used by the user at any position in space with any attitude. Correspondingly, the attitude initialization at any position function may be designed for the handheld control device. When the user clicks the big round button at any time, any position, and any attitude, the attitude of the handheld control device may be reset to the center, and the unmanned aerial vehicle may also brake to return to the center. The difficulty of the user's operation of the handheld control device may be reduced and the user's flying experience in the flashlight mode may be improved.

Exemplarily, the mode key may be used to switch to the head tracking mode. When an attitude sensor (an IMU or a gyroscope) is provided in the head-mounted device, changes in the human head may be sensed. After entering the head tracking mode, the gimbal of the unmanned aerial vehicle may follow the attitude of the head-mounted device.

In some embodiments, the unmanned aerial vehicle may be also able to follow the attitude of the head-mounted device. For example, the attitude sensor (IMU/gyroscope) may be provided in the head-mounted device, to sense changes in the human head. After entering head tracking mode, the unmanned aerial vehicle and/or the gimbal may follow the attitude of the head-mounted device.

Exemplarily, the attitude adjustment of the gimbal may be controlled by the attitude change of the head-mounted device. For example, the x-axis of the head-mounted device may control the pitch angle and yaw angle of the gimbal (the definition is the same as that of the handheld control device). By decoupling the gimbal control and unmanned aerial vehicle flight, the head-mounted device may control the orientation of the gimbal, and the handheld control device may control the movement direction of the unmanned aerial vehicle, such that functions such as surround photographing may be realized.

In some embodiments, in the flashlight mode, the unique interactions on the head-mounted device may include: HOME point display. The unmanned aerial vehicle may record the HOME point when it takes off, and when the unmanned aerial vehicle deviates from the HOME point, the head-mounted device may display the direction of the HOME point to guide the user to return home correctly.

In some embodiments, an intelligent reminder function may be provided. When the unmanned aerial vehicle performs automatic start, automatic take-off, automatic return, or automatic landing, the unmanned aerial vehicle cannot be controlled by humans. At this time, the head-mounted device may actively prompt that the unmanned aerial vehicle is in the intelligent functions, to prevent the user from being confused because of the inability to control the unmanned aerial vehicle and guide the user to use the keys to control the unmanned aerial vehicle correctly.

In some embodiments, when the unmanned aerial vehicle has insufficient power, the compass needs to be calibrated, the temperature of the unmanned aerial vehicle is too high, the motor is blocked, etc., the head-mounted device may display red to remind the user to ensure flight safety.

In some embodiments, brake lock and unlock prompts may be provided. During flight, the user may press the brake button to make the unmanned aerial vehicle quickly brake and hover, and at the same time the handle of the handheld control device may be locked such that the unmanned aerial vehicle cannot be controlled. Correspondingly, the head-mounted device may prompt the user that the brake is locked. When the user wants to control the unmanned aerial vehicle again, he may need to level the handheld control device and click the brake button again to unlock the handheld control device. When the unlocking fails, the head-mounted device may prompt the user to level the handheld control device. The above brake lock and unlock interaction may ensure the safety, reliability and consistency of multiple people flying with the same handheld control device.

In some embodiments, a spectator mode may be provided. The unmanned aerial vehicle may be connected to two head-mounted devices at the same time in the flashlight mode. One head-mounted device that controls the flight with the handheld control device may be the main head-mounted device, and the other may be the slave head-mounted device which is not able to control the unmanned aerial vehicle and mainly act as the role of the audience's perspective, to increase the fun of multiplayer experience flying.

Exemplarily, the unmanned aerial vehicle may be connected to two head-mounted devices at the same time in the flashlight mode, and each of the two head-mounted devices may correspond to a handheld control device. When one of the handheld control devices is locked, the other handheld control device may be unlocked to control the unmanned aerial vehicle.

In the control method of the unmanned aerial vehicle provided by the present disclosure, the attitude information of the handheld control device may be obtained. The control information of the unmanned aerial vehicle may be determined according to the attitude information of the handheld control device, and may be sent to the head-mounted device, such that the head-mounted device displays the mark on the display device of the head-mounted device according to the control information of the unmanned aerial vehicle. The mark may be used to indicate the flight direction of the unmanned aerial vehicle. Therefore, the user may be able to control the unmanned aerial vehicle by adjusting the attitude of the handheld control device, which is in line with human intuition. The display mark may be used to indicate the flight direction of the unmanned aerial vehicle, such that a more intuitive control experience may be provided to the user and flight control may be easier and safer.

The rotation of the handheld control device may be more intuitively transformed into the attitude control of the unmanned aerial vehicle, to achieve the purpose of three-way interaction between human, the handheld control device, and the unmanned aerial vehicle. In some embodiments, the user may be able to operate the unmanned aerial vehicle with only one hand. The body movements such as wrist rotation may be converted into adjustment instructions for the unmanned aerial vehicle's attitude in a way that conforms to human intuition.

Figure 14:
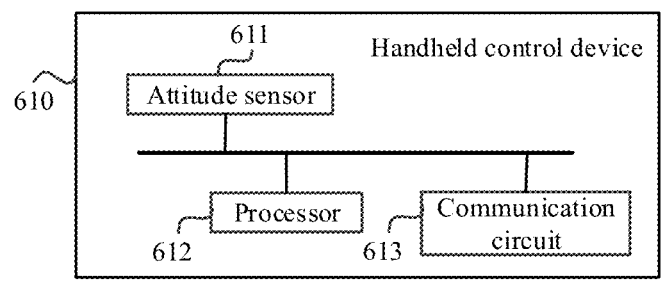
FIG. 14 is a schematic block diagram of a handheld control device consistent with the present disclosure.

The present disclosure also provides a handheld control device. In one embodiment, as shown in FIG. 14 which is a block schematic diagram of an exemplary handheld control device, the handheld control device 610 includes motion sensing remote control, which is not limited in the present disclosure.

The handheld control device 610 includes an attitude sensor 611 and a communication circuit 612. The attitude sensor 611 is used to obtain the attitude information of the handheld control device 610, and the communication circuit 612 is used to send the attitude information of the handheld control device 610 to the unmanned aerial vehicle, such that the unmanned aerial vehicle determines the control information of the unmanned aerial vehicle according to the attitude information of the handheld control device 610 and sends the control information of the unmanned aerial vehicle to the head-mounted device. The head-mounted device displays a mark in the display device of the head-mounted device and the mark is used to indicate the flight direction of the unmanned aerial vehicle.

Exemplarily, the unmanned aerial vehicle may obtain the attitude information sent by the handheld control device, determine the control information of the unmanned aerial vehicle according to the attitude information of the handheld control device, perform corresponding actions according to the control information, and send the control information of the unmanned aerial vehicle to the head-mounted device, such that the head-mounted device displays the mark on the display device of the head-mounted device according to the control information of the unmanned aerial vehicle, where the mark is used to indicate the flight direction of the unmanned aerial vehicle.

In some embodiments, the handheld control device may include an accelerator device.

As shown in FIG. 14, the handheld control device further includes one or more processors 613. The one or more processors 613 work individually or jointly, to obtain the accelerator control value. The accelerator control value is generated based on the operation on the accelerator device.

Exemplarily, the communication circuit may be also used to send the amount of the accelerator control value to the unmanned aerial vehicle, such that the unmanned aerial vehicle controls the unmanned aerial vehicle to fly toward the direction indicated by the mark according to the accelerator control value.

Exemplarily, when the accelerator control value is the minimum accelerator control value, the position of the unmanned aerial vehicle remains unchanged.

Exemplarily, when the accelerator control value is the maximum accelerator control value, the unmanned aerial vehicle flies towards the flight direction indicated by the mark at a preset flight speed.

Exemplarily, when the accelerator control value changes uniformly from the minimum accelerator control value to the maximum accelerator control value, the increment of the flight speed of the unmanned aerial vehicle gradually becomes larger.

Exemplarily, the unmanned aerial vehicle includes a photographing device, and the photographing device is installed on the unmanned aerial vehicle through a gimbal.

The control information of the unmanned aerial vehicle includes unmanned aerial vehicle attitude control information and/or gimbal attitude control information.

Exemplarily, the yaw attitude and/or roll attitude of the handheld control device are used to determine the yaw attitude of the unmanned aerial vehicle, and/or the pitching attitude of the handheld control device is used to determine the pitching attitude of the gimbal.

Exemplarily, the control information of the unmanned aerial vehicle determined according to the yaw angle and/or roll angle of the handheld control device is used to move the mark to the left or right, and/or the control information of the unmanned aerial vehicle determined according to the pitch angle of the handheld control device is used to move the mark upward or downward.

Exemplarily, the control information used to control the unmanned aerial vehicle and/or the gimbal of the unmanned aerial vehicle to turn left in the yaw direction is used to move the mark to the left, and/or the control information sued to control the unmanned aerial vehicle and/or the gimbal of the unmanned aerial vehicle to turn right in the yaw direction is used to move the mark to the right.

Exemplarily, the control information used to control the unmanned aerial vehicle and/or the gimbal of the unmanned aerial vehicle to rotate upward in the pitch direction is used to move the mark upward, and/or the control information used to control the unmanned aerial vehicle and/or the gimbal of the unmanned aerial vehicle to rotate downward in the pitch direction, is used to move the mark downward.

Exemplarily, the control information of the unmanned aerial vehicle is determined according to the attitude information of the handheld control device and the reference attitude information of the handheld control device.

Exemplarily, the control information of the unmanned aerial vehicle includes the target yaw angular speed of the unmanned aerial vehicle.

The target yaw angular speed of the unmanned aerial vehicle is determined according to the yaw angle of the handheld control device and the reference yaw angle of the handheld control device, or is determined according to the roll angle of the handheld control device and the reference roll angle of the handheld control device.

Exemplarily, the control information of the unmanned aerial vehicle includes the target yaw angle of the unmanned aerial vehicle.

The target yaw angle of the unmanned aerial vehicle is determined according to the yaw angle of the handheld control device and the reference yaw angle of the handheld control device, or is determined according to the roll angle of the handheld control device and the reference roll angle of the handheld control device.

Exemplarily, the control information of the unmanned aerial vehicle includes the target yaw angular speed and the target yaw angle of the unmanned aerial vehicle.

The target yaw angular speed of the unmanned aerial vehicle is determined according to the yaw angle of the handheld control device and the reference yaw angle of the handheld control device. The target yaw angle is determined according to the roll angle of the handheld control device and the reference roll angle of the handheld control device.

Exemplarily, the target yaw angle of the unmanned aerial vehicle and the target yaw angular speed of the unmanned aerial vehicle are used to control the unmanned aerial vehicle to rotate by the target yaw angle, and control the unmanned aerial vehicle to continue to rotate at the target yaw angular speed after that.

Exemplarily, the target yaw angle of the unmanned aerial vehicle and the target yaw angular speed of the unmanned aerial vehicle are used to control the unmanned aerial vehicle to rotate by at least the target yaw angle at the target yaw angular speed.

Exemplarily, the target yaw angle of the unmanned aerial vehicle and the target yaw angular speed of the unmanned aerial vehicle are used to: according to the integral of the target yaw angle and the target yaw angular speed over a preset time interval, determine the control angle of the unmanned aerial vehicle in the yaw direction.

Exemplarily, the unmanned aerial vehicle includes a photographing device, and the photographing device is installed on the unmanned aerial vehicle through a gimbal.

The control information of the unmanned aerial vehicle includes a target pitch angle of the gimbal determined according to the pitch angle of the handheld control device and the reference pitch angle of the handheld control device.

Exemplarily, when the deviation between the pitch angle of the handheld control device and the reference pitch angle of the handheld control device is larger than a preset threshold, the mark is used to instruct the unmanned aerial vehicle to vertically ascend or descend.

Exemplarily, the one or more processors are further configured to use the attitude information of the handheld control device when the initialization operation is triggered as the reference attitude information of the handheld control device.

Exemplarily, when the one or more processors use the attitude information of the handheld control device when the initialization operation is triggered as the reference attitude information of the handheld control device, it is used to: use the yaw angle of the handheld control device when the initialization operation is triggered as the reference yaw angle of the handheld control device, where the reference pitch angle and reference roll angle of the handheld control device are preset values.

Exemplarily, when the one or more processors use the attitude information of the handheld control device when the initialization operation is triggered as the reference attitude information of the handheld control device, it is used to:

when the attitude information of the handheld control device when the initialization operation is triggered meets a preset condition, use the attitude information of the handheld control device when the initialization operation is triggered as the reference attitude information of the handheld control device, and otherwise, output prompt information to prompt the user to adjust the attitude of the handheld control device.

Exemplarily, the one or more processors are also used to:

when the unmanned aerial vehicle takes off to a preset height from the ground, enable determining the control information of the unmanned aerial vehicle according to the attitude information of the handheld control device.

Exemplarily, the one or more processors are also used to:

when the unmanned aerial vehicle is in the automatic landing state, if the obtained accelerator control value is larger than the preset accelerator control value threshold, enable determining the control information of the unmanned aerial vehicle according to the attitude information of the handheld control device.

Exemplarily, the mark is a flight indicator mark, and the communication circuit is also used to:

when the handheld control device is in the head-mounted device operation mode, send the attitude information of the handheld control device to the head-mounted device, such that the display device of the head-mounted device displays the operation mark, where the operation mark is used to operate the virtual control components on the display device.

The specific principle and implementation of the handheld control device provided in the embodiment of the present disclosure are similar to the control method of the unmanned aerial vehicle in the foregoing embodiments, and will not be repeated here.

Figure 15:
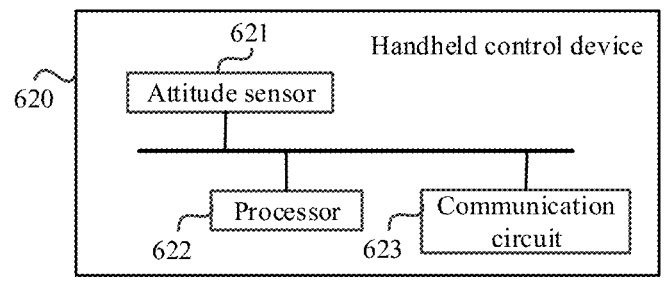
FIG. 15 is a schematic block diagram of another handheld control device consistent with the present disclosure.

The present disclosure also provides another handheld control device. In one embodiment, as shown in FIG. 15 which is a block schematic diagram of an exemplary handheld control device, the handheld control device 620 includes motion sensing remote control, which is not limited in the present disclosure.

The handheld control device 620 includes an attitude sensor 621, one or more processors 622, and a communication circuit 623.

The attitude sensor 621 is used to obtain the attitude information of the handheld control device 620. The one or more processors 623 work individually or jointly to determine the control information of the unmanned aerial vehicle according to the attitude information of the handheld control device 620. The communication circuit 622 is used to send the control information of the unmanned aerial vehicle to the head-mounted device. The head-mounted device displays a mark in the display device of the head-mounted device and the mark is used to indicate the flight direction of the unmanned aerial vehicle.

Exemplarily, the handheld control device may obtain the attitude information of the handheld control device, determine the control information of the unmanned aerial vehicle according to the attitude information of the handheld control device, send the control information of the unmanned aerial vehicle to the unmanned aerial vehicle such that the unmanned aerial vehicle performs corresponding actions according to the control information, and send the control information of the unmanned aerial vehicle to the head-mounted device such that the head-mounted device displays the mark on the display device of the head-mounted device according to the control information of the unmanned aerial vehicle, where the mark is used to indicate the flight direction of the unmanned aerial vehicle. Exemplarily, the control information of the unmanned aerial vehicle determined by the handheld control device may be directly sent to the unmanned aerial vehicle, or may be sent to the unmanned aerial vehicle through the head-mounted device, and the transmission may be more reliable.

In some embodiments, the handheld control device may include an accelerator device.

The one or more processors 623 may be also used to obtain the accelerator control value. The accelerator control value is generated based on the operation on the accelerator device.

Exemplarily, the communication circuit may be also used to send the amount of the accelerator control value to the unmanned aerial vehicle, such that the unmanned aerial vehicle controls the unmanned aerial vehicle to fly toward the direction indicated by the mark according to the accelerator control value.

Exemplarily, when the accelerator control value is the minimum accelerator control value, the position of the unmanned aerial vehicle remains unchanged.

Exemplarily, when the accelerator control value is the maximum accelerator control value, the unmanned aerial vehicle flies towards the flight direction indicated by the mark at a preset flight speed.

Exemplarily, when the accelerator control value changes uniformly from the minimum accelerator control value to the maximum accelerator control value, the increment of the flight speed of the unmanned aerial vehicle gradually becomes larger.

Exemplarily, the unmanned aerial vehicle includes a photographing device, and the photographing device is installed on the unmanned aerial vehicle through a gimbal.

The control information of the unmanned aerial vehicle includes unmanned aerial vehicle attitude control information and/or gimbal attitude control information.

Exemplarily, the yaw attitude and/or roll attitude of the handheld control device are used to determine the yaw attitude of the unmanned aerial vehicle, and/or the pitching attitude of the handheld control device is used to determine the pitching attitude of the gimbal.

Exemplarily, the control information of the unmanned aerial vehicle determined according to the yaw angle and/or roll angle of the handheld control device is used to move the mark to the left or right, and/or the control information of the unmanned aerial vehicle determined according to the pitch angle of the handheld control device is used to move the mark upward or downward.

Exemplarily, the control information used to control the unmanned aerial vehicle and/or the gimbal of the unmanned aerial vehicle to turn left in the yaw direction is used to move the mark to the left, and/or the control information sued to control the unmanned aerial vehicle and/or the gimbal of the unmanned aerial vehicle to turn right in the yaw direction is used to move the mark to the right.

Exemplarily, the control information used to control the unmanned aerial vehicle and/or the gimbal of the unmanned aerial vehicle to rotate upward in the pitch direction is used to move the mark upward, and/or the control information used to control the unmanned aerial vehicle and/or the gimbal of the unmanned aerial vehicle to rotate downward in the pitch direction, is used to move the mark downward.

Exemplarily, when the one or more processors are used to determine the control information of the unmanned aerial vehicle according to the attitude information of the handheld control device, the one or more processors are used to: obtain the reference attitude information of the handheld control device, and determine the control information of the unmanned aerial vehicle according to the attitude information of the handheld control device and the reference attitude information of the handheld control device.

Exemplarily, when the one or more processors are used to determine the control information of the unmanned aerial vehicle according to the attitude information of the handheld control device and the reference attitude information of the handheld control device, the one or more processors are used to: determine the target yaw angular speed of the unmanned aerial vehicle according to the yaw angle of the handheld control device and the reference yaw angle of the handheld control device; or determine the target yaw angular speed of the unmanned aerial vehicle according to the roll angle of the handheld control device and the reference roll angle of the handheld control device.

Exemplarily, when the one or more processors are used to determine the control information of the unmanned aerial vehicle according to the attitude information of the handheld control device and the reference attitude information of the handheld control device, the one or more processors are used to: determine the target yaw angle of the unmanned aerial vehicle according to the yaw angle of the handheld control device and the reference yaw angle of the handheld control device, or determine the target yaw angle of the unmanned aerial vehicle according to the roll angle of the handheld control device and the reference roll angle of the handheld control device.

Exemplarily, when the one or more processors are used to determine the control information of the unmanned aerial vehicle according to the attitude information of the handheld control device and the reference attitude information of the handheld control device, the one or more processors are used to: determine the target yaw angle of the unmanned aerial vehicle is determined according to the yaw angle of the handheld control device and the reference yaw angle of the handheld control device, and determine the target yaw angular speed according to the roll angle of the handheld control device and the reference roll angle of the handheld control device.

Exemplarily, the target yaw angle of the unmanned aerial vehicle and the target yaw angular speed of the unmanned aerial vehicle are used to control the unmanned aerial vehicle to rotate by the target yaw angle, and control the unmanned aerial vehicle to continue to rotate at the target yaw angular speed after that.

Exemplarily, the target yaw angle of the unmanned aerial vehicle and the target yaw angular speed of the unmanned aerial vehicle are used to control the unmanned aerial vehicle to rotate by at least the target yaw angle at the target yaw angular speed.

Exemplarily, the target yaw angle of the unmanned aerial vehicle and the target yaw angular speed of the unmanned aerial vehicle are used to: according to the integral of the target yaw angle and the target yaw angular speed over a preset time interval, determine the control angle of the unmanned aerial vehicle in the yaw direction.

Exemplarily, the unmanned aerial vehicle includes a photographing device, and the photographing device is installed on the unmanned aerial vehicle through a gimbal.

When the one or more processors are used to determine the control information of the unmanned aerial vehicle according to the attitude information of the handheld control device and the reference attitude information of the handheld control device, the one or more processors are used to: determine a target pitch angle of the gimbal according to the pitch angle of the handheld control device and the reference pitch angle of the handheld control device.

Exemplarily, when the deviation between the pitch angle of the handheld control device and the reference pitch angle of the handheld control device is larger than a preset threshold, the mark is used to instruct the unmanned aerial vehicle to vertically ascend or descend.

Exemplarily, when the one or more processors are used to determine the control information of the unmanned aerial vehicle according to the attitude information of the handheld control device and the reference attitude information of the handheld control device, the one or more processors are used to: obtain the reference attitude information of the unmanned aerial vehicle, and determine the control information of the unmanned aerial vehicle according to the attitude information of the handheld control device, the reference attitude information of the handheld control device, and the reference attitude information of the unmanned aerial vehicle.

Exemplarily, when the one or more processors are used to obtain the reference attitude information of the handheld control device and the reference attitude information of the unmanned aerial vehicle, the one or more processors are used to: use the attitude information of the handheld control device when the initialization operation is triggered as the reference attitude information of the handheld control device, and use the attitude information of the unmanned aerial vehicle when the initialization operation is triggered as the reference attitude information of the unmanned aerial vehicle.

Exemplarily, when the one or more processors are used to obtain the reference attitude information of the handheld control device and the reference attitude information of the unmanned aerial vehicle, it is used to: use the yaw angle of the handheld control device when the initialization operation is triggered as the reference yaw angle of the handheld control device, and use the yaw angle of the unmanned aerial vehicle when the initialization operation is triggered as the reference yaw angle of the unmanned aerial vehicle, where the reference pitch angle and reference roll angle of the handheld control device are preset values.

Exemplarily, when the one or more processors are used to use the attitude information of the handheld control device when the initialization operation is triggered as the reference attitude information of the handheld control device and use the attitude information of the unmanned aerial vehicle when the initialization operation is triggered as the reference attitude information of the unmanned aerial vehicle, the one or more processors are used to: when the attitude information of the handheld control device when the initialization operation is triggered meets a preset condition, use the attitude information of the handheld control device when the initialization operation is triggered as the reference attitude information of the handheld control device, and use the attitude information of the unmanned aerial vehicle when the initialization operation is triggered as the reference attitude information of the unmanned aerial vehicle, and otherwise, output prompt information to prompt the user to adjust the attitude of the handheld control device.

Exemplarily, the one or more processors are also used to:
when the unmanned aerial vehicle takes off to a preset height from the ground, enable determining the control information of the unmanned aerial vehicle according to the attitude information of the handheld control device.

Exemplarily, the one or more processors are also used to:
when the unmanned aerial vehicle is in the automatic landing state, control the gimbal of the unmanned aerial vehicle to rotate downwards by a preset angle in the pitch direction.

Exemplarily, the one or more processors are also used to:
if the obtained accelerator control value is larger than the preset accelerator control value threshold, enable determining the control information of the unmanned aerial vehicle according to the attitude information of the handheld control device.

Exemplarily, the mark is a flight indicator mark, and the communication circuit is also used to:
when the handheld control device is in the head-mounted device operation mode, send the attitude information of the handheld control device to the head-mounted device, such that the display device of the head-mounted device displays the operation mark, where the operation mark is used to operate the virtual control components on the display device.

The specific principle and implementation of the handheld control device provided in the embodiment of the present disclosure are similar to the control method of the unmanned aerial vehicle in the foregoing embodiments, and will not be repeated here.

The present disclosure also provides a computer-readable storage medium. The computer-readable storage medium may be configured to store a computer program. When the computer program is executed by a processor, the control method of the unmanned aerial vehicle provided by various embodiments of the present disclosure may be implemented.

The computer-readable storage medium may be an internal storage unit of the handheld control device described in any of the foregoing embodiments of the present disclosure, such as a hard disk or a memory of the handheld control device. The computer-readable storage medium may also be an external storage device of the handheld control device, such as a plug-in hard disk equipped on the device, a smart memory card (SMC), a secure digital card (SD), or a flash card, etc.

Figure 16:
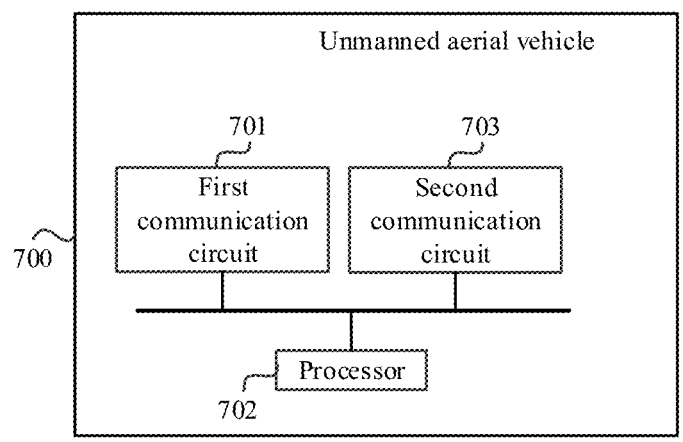
FIG. 16 is a schematic block diagram of an unmanned aerial vehicle consistent with the present disclosure.

The present disclosure also provides an unmanned aerial vehicle. As shown in FIG. 16 which is a schematic diagram of an unmanned aerial vehicle 700, the unmanned aerial vehicle 700 may be a rotor unmanned aerial vehicle ((such as a quadrotor unmanned aerial vehicle, a hexacopter unmanned aerial vehicle, or an octorotor unmanned aerial vehicle), or a fixed-wing unmanned aerial vehicle.

The unmanned aerial vehicle 700 includes a first communication circuit 701, one or more processors 702, and a second communication circuit 703.

The first communication circuit 701 is used to obtain the attitude information of the handheld control device. The one or more processors 702 work individually or jointly, and are used to determine the control information of the unmanned aerial vehicle 700 according to the attitude information of the handheld control device. The second communication circuit 703 is configured to send the control information of the unmanned aerial vehicle 700 to the head-mounted device, such that the head-mounted device displays a mark on the display device of the head-mounted device according to the control information of the unmanned aerial vehicle 700. The mark is used to indicate the flight direction of the unmanned aerial vehicle 700.

The first communication circuit 701 and the second communication circuit 703 may be different communication circuits, or may be the same communication circuit, for example, a communication circuit that may be integrated.

Exemplarily, the unmanned aerial vehicle may obtain the attitude information sent by the handheld control device, determine the control information of the unmanned aerial vehicle according to the attitude information of the handheld control device, perform corresponding actions according to the control information, and transfer the control information of the unmanned aerial vehicle to the head-mounted device, such that the head-mounted device displays a mark on the display device of the head-mounted device according to the control information of the unmanned aerial vehicle. The mark is used to indicate the flight direction of the unmanned aerial vehicle.

The first communication circuit may be further used to obtain the accelerator control value. The accelerator control value is generated based on the operation on the accelerator device of the handheld control device.

The one or more processors may be further used to control the unmanned aerial vehicle to fly toward the direction indicated by the mark according to the accelerator control value.

Exemplarily, when the accelerator control value is the minimum accelerator control value, the position of the unmanned aerial vehicle remains unchanged.

Exemplarily, when the accelerator control value is the maximum accelerator control value, the unmanned aerial vehicle flies towards the flight direction indicated by the mark at a preset flight speed.

Exemplarily, when the accelerator control value changes uniformly from the minimum accelerator control value to the maximum accelerator control value, the increment of the flight speed of the unmanned aerial vehicle gradually becomes larger.

Exemplarily, the unmanned aerial vehicle may include a photographing device. The second communication circuit may be used to send the image information captured by the photographing device to the head-mounted device, such that the display device of the head-mounted device imposes and displays the image information and the mark.

Exemplarily, the photographing device is installed on the unmanned aerial vehicle through a gimbal.

The control information of the unmanned aerial vehicle includes unmanned aerial vehicle attitude control information and/or gimbal attitude control information.

Exemplarily, the yaw attitude of the unmanned aerial vehicle may be related to the yaw attitude and/or roll attitude of the handheld control device, and/or the pitch attitude of the gimbal may be related to the pitch attitude of the handheld control device.

Exemplarily, the control information of the unmanned aerial vehicle determined according to the yaw angle and/or roll angle of the handheld control device is used to move the mark to the left or right, and/or the control information of the unmanned aerial vehicle determined according to the pitch angle of the handheld control device is used to move the mark upward or downward.

Exemplarily, the control information used to control the unmanned aerial vehicle and/or the gimbal of the unmanned aerial vehicle to turn left in the yaw direction is used to move the mark to the left, and/or the control information sued to control the unmanned aerial vehicle and/or the gimbal of the unmanned aerial vehicle to turn right in the yaw direction is used to move the mark to the right.

Exemplarily, the control information used to control the unmanned aerial vehicle and/or the gimbal of the unmanned aerial vehicle to rotate upward in the pitch direction is used to move the mark upward, and/or the control information used to control the unmanned aerial vehicle and/or the gimbal of the unmanned aerial vehicle to rotate downward in the pitch direction, is used to move the mark downward.

Exemplarily, when the one or more processors are used to determine the control information of the unmanned aerial vehicle according to the attitude information of the handheld control device, the one or more processors are used to: determine the control information of the unmanned aerial vehicle according to the attitude information of the handheld control device and the reference attitude information of the handheld control device.

Exemplarily, when the one or more processors are used to determine the control information of the unmanned aerial vehicle according to the attitude information of the handheld control device and the reference attitude information of the handheld control device, the one or more processors are used to: determine the target yaw angular speed of the unmanned aerial vehicle according to the yaw angle of the handheld control device and the reference yaw angle of the handheld control device, or determine the target yaw angular speed of the unmanned aerial vehicle according to the roll angle of the handheld control device and the reference roll angle of the handheld control device.

Exemplarily, when the one or more processors are used to determine the control information of the unmanned aerial vehicle according to the attitude information of the handheld control device and the reference attitude information of the handheld control device, the one or more processors are used to: determine the target yaw angle of the unmanned aerial vehicle according to the yaw angle of the handheld control device and the reference yaw angle of the handheld control device, or determine the target yaw angle of the unmanned aerial vehicle according to the roll angle of the handheld control device and the reference roll angle of the handheld control device.

Exemplarily, when the one or more processors are used to determine the control information of the unmanned aerial vehicle according to the attitude information of the handheld control device and the reference attitude information of the handheld control device, the one or more processors are used to: determine the target yaw angle of the unmanned aerial vehicle is determined according to the yaw angle of the handheld control device and the reference yaw angle of the handheld control device, and determine the target yaw angular speed according to the roll angle of the handheld control device and the reference roll angle of the handheld control device.

Exemplarily, the target yaw angle of the unmanned aerial vehicle and the target yaw angular speed of the unmanned aerial vehicle are used to control the unmanned aerial vehicle to rotate by the target yaw angle, and control the unmanned aerial vehicle to continue to rotate at the target yaw angular speed after that.

Exemplarily, the target yaw angle of the unmanned aerial vehicle and the target yaw angular speed of the unmanned aerial vehicle are used to control the unmanned aerial vehicle to rotate by at least the target yaw angle at the target yaw angular speed.

Exemplarily, the target yaw angle of the unmanned aerial vehicle and the target yaw angular speed of the unmanned aerial vehicle are used to: according to the integral of the target yaw angle and the target yaw angular speed over a preset time interval, determine the control angle of the unmanned aerial vehicle in the yaw direction.

Exemplarily, the unmanned aerial vehicle includes a photographing device, and the photographing device is installed on the unmanned aerial vehicle through a gimbal.

When the one or more processors are used to determine the control information of the unmanned aerial vehicle according to the attitude information of the handheld control device and the reference attitude information of the handheld control device, the one or more processors are used to: determine a target pitch angle of the gimbal according to the pitch angle of the handheld control device and the reference pitch angle of the handheld control device.

Exemplarily, when the deviation between the pitch angle of the handheld control device and the reference pitch angle of the handheld control device is larger than a preset threshold, the mark is used to instruct the unmanned aerial vehicle to vertically ascend or descend.

Exemplarily, when the one or more processors are used to determine the control information of the unmanned aerial vehicle according to the attitude information of the handheld control device and the reference attitude information of the handheld control device, the one or more processors are used to: obtain the reference attitude information of the unmanned aerial vehicle, and determine the control information of the unmanned aerial vehicle according to the attitude information of the handheld control device, the reference attitude information of the handheld control device, and the reference attitude information of the unmanned aerial vehicle.

Exemplarily, when the one or more processors are used to obtain the reference attitude information of the handheld control device and the reference attitude information of the unmanned aerial vehicle, the one or more processors are used to: use the attitude information of the handheld control device when the initialization operation is triggered as the reference attitude information of the handheld control device, and use the attitude information of the unmanned aerial vehicle when the initialization operation is triggered as the reference attitude information of the unmanned aerial vehicle.

Exemplarily, when the one or more processors are used to obtain the reference attitude information of the handheld control device and the reference attitude information of the unmanned aerial vehicle, it is used to: use the yaw angle of the handheld control device when the initialization operation is triggered as the reference yaw angle of the handheld control device, and use the yaw angle of the unmanned aerial vehicle when the initialization operation is triggered as the reference yaw angle of the unmanned aerial vehicle, where the reference pitch angle and reference roll angle of the handheld control device are preset values.

Exemplarily, when the one or more processors are used to use the attitude information of the handheld control device when the initialization operation is triggered as the reference attitude information of the handheld control device and use the attitude information of the unmanned aerial vehicle when the initialization operation is triggered as the reference attitude information of the unmanned aerial vehicle, the one or more processors are used to: when the attitude information of the handheld control device when the initialization operation is triggered meets a preset condition, use the attitude information of the handheld control device when the initialization operation is triggered as the reference attitude information of the handheld control device, and use the attitude information of the unmanned aerial vehicle when the initialization operation is triggered as the reference attitude information of the unmanned aerial vehicle, and otherwise, output prompt information to prompt the user to adjust the attitude of the handheld control device.

Exemplarily, the one or more processors are also used to:
when the unmanned aerial vehicle takes off to a preset height from the ground, enable determining the control information of the unmanned aerial vehicle according to the attitude information of the handheld control device.

Exemplarily, the one or more processors are also used to:
when the unmanned aerial vehicle is in the automatic landing state, control the gimbal of the unmanned aerial vehicle to rotate downwards by a preset angle in the pitch direction.

Exemplarily, the one or more processors are also used to: when the unmanned aerial vehicle is in the automatic landing state, if the obtained accelerator control value is larger than the preset accelerator control value threshold, enable determining the control information of the unmanned aerial vehicle according to the attitude information of the handheld control device.

The specific principle and implementation of the unmanned aerial vehicle provided in the embodiment of the present disclosure are similar to the control method of the unmanned aerial vehicle in the foregoing embodiments, and will not be repeated here.

The present disclosure also provides a computer-readable storage medium. The computer-readable storage medium may be configured to store a computer program. When the computer program is executed by a processor, the control method of the unmanned aerial vehicle provided by various embodiments of the present disclosure may be implemented.

The computer-readable storage medium may be an internal storage unit of the unmanned aerial vehicle described in any of the foregoing embodiments of the present disclosure, such as a hard disk or a memory of the unmanned aerial vehicle. The computer-readable storage medium may also be an external storage device of the unmanned aerial vehicle, such as a plug-in hard disk equipped on the device, a smart memory card (SMC), a secure digital card (SD), or a flash card, etc.

Figure 17:
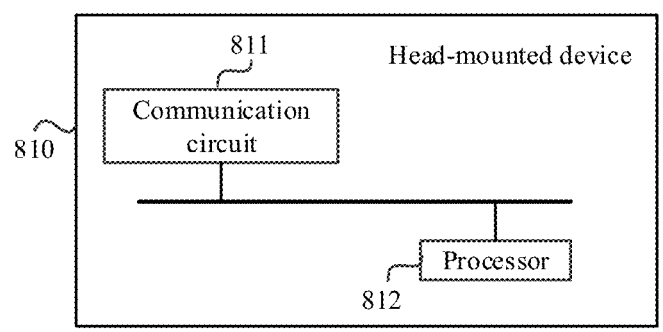
FIG. 17 is a schematic block diagram of a head-mounted device consistent with the present disclosure.

The present disclosure also provides a head-mounted device. As shown in FIG. 17 which is a block diagram of the head-mounted device 810 provided by one embodiment of the present disclosure, the head-mounted device 810 may be glasses/goggles, for example, first person view (FPV) glasses/goggles. The head-mounted device 810 includes a communication circuit 811 and one or more processors 812.

The communication circuit 811 is used to obtain the control information of the unmanned aerial vehicle. The one or more processors 812 work individually or jointly, and are used to display a mark on the display device of the head-mounted device according to the control information of the unmanned aerial vehicle. The mark is used to indicate the flight direction of the unmanned aerial vehicle.

Exemplarily, the unmanned aerial vehicle may obtain the attitude information sent by the handheld control device, determine the control information of the unmanned aerial vehicle according to the attitude information of the handheld control device, perform corresponding actions according to the control information, and transfer the control information of the unmanned aerial vehicle to the head-mounted device, such that the head-mounted device displays a mark on the display device of the head-mounted device according to the control information of the unmanned aerial vehicle. The mark is used to indicate the flight direction of the unmanned aerial vehicle.

Exemplarily, the handheld control device obtains its own attitude information, determines the control information of the unmanned aerial vehicle according to the attitude information, and sends the control information of the unmanned aerial vehicle such that the unmanned aerial vehicle performs corresponding actions according to the control information, and sends the control information of the unmanned aerial vehicle to the head-mounted device such that the head-mounted device displays a mark on the display device of the head-mounted device according to the control information of the unmanned aerial vehicle. The mark is used to indicate the flight direction of the unmanned aerial vehicle.

In some embodiments, when the one or more processors 812 are used to display the mark according to the control information of the unmanned aerial vehicle, the one or more processors 812 are used to calculate the pixel coordinates of the mark on the display device according to the control information of the unmanned aerial vehicle and the display parameters of the display device, to display the mark on the display device.

Exemplarily, the display parameters include the aspect ratio and resolution of the display device.

Figure 18:
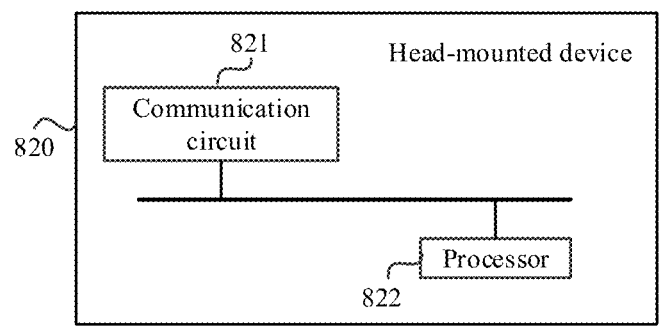
FIG. 18 is a schematic block diagram of another head-mounted device consistent with the present disclosure.

The present disclosure also provides another head-mounted device. As shown in FIG. 18 which is a block diagram of the head-mounted device 820 provided by one embodiment of the present disclosure, the head-mounted device 820 may be glasses/goggles, for example, first person view (FPV) glasses/goggles. The head-mounted device 820 includes a communication circuit 821 and one or more processors 822.

The communication circuit 821 is used to obtain the attitude information of the handheld control device. The one or more processors 822 work individually or jointly, and are used to display a mark on the display device of the head-mounted device according to the control information of the unmanned aerial vehicle. The mark is used to indicate the flight direction of the unmanned aerial vehicle.

In some embodiments, when the one or more processors 822 are used to display the mark according to the control information of the unmanned aerial vehicle, the one or more processors 822 are used to calculate the pixel coordinates of the mark on the display device according to the control information of the unmanned aerial vehicle and the display parameters of the display device, to display the mark on the display device.

Exemplarily, the display parameters include the aspect ratio and resolution of the display device.

The present disclosure also provides a computer-readable storage medium. The computer-readable storage medium may be configured to store a computer program. When the computer program is executed by a processor, the control method of the unmanned aerial vehicle provided by various embodiments of the present disclosure may be implemented.

The computer-readable storage medium may be an internal storage unit of the head-mounted device described in any of the foregoing embodiments of the present disclosure, such as a hard disk or a memory of the head-mounted device. The computer-readable storage medium may also be an external storage device of the head-mounted device, such as a plug-in hard disk equipped on the device, a smart memory card (SMC), a secure digital card (SD), or a flash card, etc.

Figure 19:
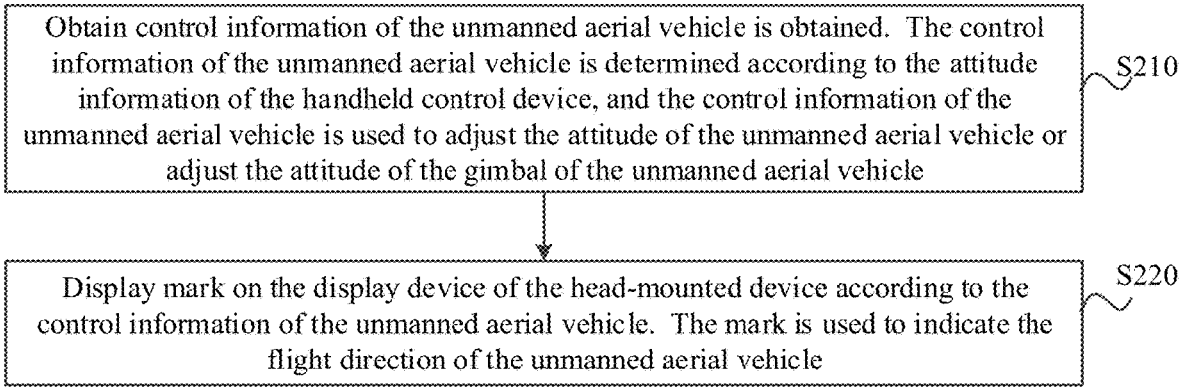
FIG. 19 is a schematic flow chart of another control method of an unmanned aerial vehicle consistent with the present disclosure.

The present disclosure also provides a control method of an unmanned aerial vehicle. As shown in FIG. 19 which is a flowchart of a control method of an unmanned aerial vehicle provided by one embodiment, the control method of an unmanned aerial vehicle may be applied to a head-mounted device.

As shown in FIG. 19, the control method of an unmanned aerial vehicle includes S210 and S220.

At S210, the control information of the unmanned aerial vehicle is obtained. The control information of the unmanned aerial vehicle is determined according to the attitude information of the handheld control device, and the control information of the unmanned aerial vehicle is used to adjust the attitude of the unmanned aerial vehicle or adjust the attitude of the gimbal of the unmanned aerial vehicle.

At S220, a mark is displayed on the display device of the head-mounted device according to the control information of the unmanned aerial vehicle. The mark is used to indicate the flight direction of the unmanned aerial vehicle.

Exemplarily, the control information of the unmanned aerial vehicle may include the target yaw angle of the unmanned aerial vehicle and/or the target yaw angular speed of the unmanned aerial vehicle. The target yaw angle of the unmanned aerial vehicle may be used to control the unmanned aerial vehicle to rotate by the target yaw angle in the yaw direction, and the target yaw angular speed may be used to control the unmanned aerial vehicle to rotate in the yaw direction at the target yaw angular speed.

In some embodiments, the mark may be displayed on the display device of the head-mounted device according to the control information of the unmanned aerial vehicle, by: calculating the pixel coordinates of the mark on the display device according to the control information of the unmanned aerial vehicle and the display parameters of the display device, to display the mark on the display device.

Exemplarily, the display parameters include the aspect ratio and resolution of the display device.

Figure 20:
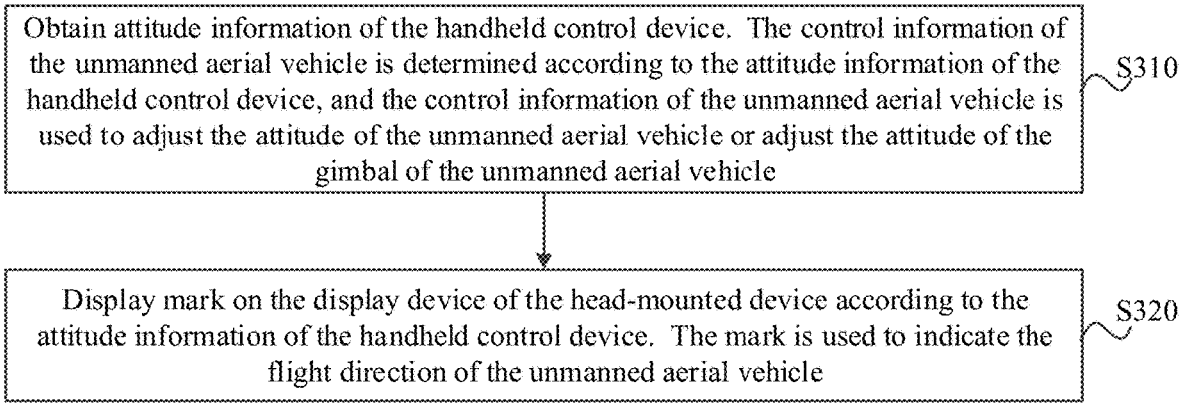
FIG. 20 is a schematic flow chart of another control method of an unmanned aerial vehicle consistent with the present disclosure.

The present disclosure also provides another control method of an unmanned aerial vehicle. As shown in FIG. 20 which is a flowchart of a control method of an unmanned aerial vehicle provided by one embodiment, the control method of an unmanned aerial vehicle may be applied to a head-mounted device.

As shown in FIG. 20, the control method of an unmanned aerial vehicle includes S310 and S320.

At S310, the attitude information of the handheld control device is obtained. The control information of the unmanned aerial vehicle is determined according to the attitude information of the handheld control device, and the control information of the unmanned aerial vehicle is used to adjust the attitude of the unmanned aerial vehicle or adjust the attitude of the gimbal of the unmanned aerial vehicle.

At S220, a mark is displayed on the display device of the head-mounted device according to the attitude information of the handheld control device. The mark is used to indicate the flight direction of the unmanned aerial vehicle.

Exemplarily, the control information of the unmanned aerial vehicle may include the target yaw angle of the unmanned aerial vehicle and/or the target yaw angular speed of the unmanned aerial vehicle. The target yaw angle of the unmanned aerial vehicle may be used to control the unmanned aerial vehicle to rotate by the target yaw angle in the yaw direction, and the target yaw angular speed may be used to control the unmanned aerial vehicle to rotate in the yaw direction at the target yaw angular speed.

In some embodiments, the mark may be displayed on the display device of the head-mounted device according to the control information of the unmanned aerial vehicle, by: calculating the pixel coordinates of the mark on the display device according to the control information of the unmanned aerial vehicle and the display parameters of the display device, to display the mark on the display device.

Exemplarily, the display parameters include the aspect ratio and resolution of the display device.

The present disclosure also provides a control system of an unmanned aerial vehicle. As shown in FIG. 2, the control system of the unmanned aerial vehicle includes a handheld control device, an unmanned aerial vehicle, and a head-mounted device.

It can be understood that the communication connection between the handheld control device, the unmanned aerial vehicle and the head-mounted device in FIG. 2 is only used as an example to illustrate the present disclosure. In some other embodiments, the handheld control device may be connected in communication to the unmanned aerial vehicle through the head-mounted device, or the head-mounted device may be connected in communication to the unmanned aerial vehicle through the handheld control device. In some embodiments, the handheld control device and the head-mounted device may be connected in communication to the unmanned aerial vehicle through a relay device.

The unmanned aerial vehicle may be a rotor-type unmanned aerial vehicle (such as a quad-rotor unmanned aerial vehicle, a six-rotor unmanned aerial vehicle, or an octo-rotor unmanned aerial vehicle), or a fixed-wing unmanned aerial vehicle. The head-mounted device may be glasses/goggles, for example, first person view (FPV) glasses/goggles. The handheld control device may be a motion sensor remote control.

The handheld control device may be used to obtain the attitude information of the handheld control device, and the attitude information is used to determine the control information of the unmanned aerial vehicle. The unmanned aerial vehicle may adjust the attitude of the unmanned aerial vehicle or the attitude of the gimbal of the unmanned aerial vehicle according to the control information of the unmanned aerial vehicle. The head-mounted device may be used to display a mark on the display device of the head-mounted device according to the control information of the unmanned aerial vehicle, and the mark may be used to indicate the flight direction of the unmanned aerial vehicle.

In some embodiments, the unmanned aerial vehicle may obtain the attitude information sent by the handheld control device, determine the control information of the unmanned aerial vehicle according to the attitude information of the handheld control device, perform corresponding actions according to the control information, and send the control information of the unmanned aerial vehicle to the head-mounted device, such that the head-mounted device displays the mark on the display device of the head-mounted device according to the control information of the unmanned aerial vehicle. The mark is used to indicate the flight direction of the unmanned aerial vehicle.

In some other embodiments, the handheld control device may obtain its own attitude information, determine the control information of the unmanned aerial vehicle according to the attitude information, send the control information of the unmanned aerial vehicle to the unmanned aerial vehicle such that the unmanned aerial vehicle performs corresponding actions according to the control information, and send the control information of the unmanned aerial vehicle to the head-mounted device, such that the head-mounted device displays a mark on the display device of the head-mounted device according to the control information of the unmanned aerial vehicle. The mark is used to indicate the flight direction of the unmanned aerial vehicle.

Exemplarily, the control information of the unmanned aerial vehicle determined by the handheld control device may be directly sent to the unmanned aerial vehicle, or may be sent to the unmanned aerial vehicle through the head-mounted device, and the transmission is more reliable.

In the unmanned aerial vehicle, the control method of the unmanned aerial vehicle, the control system of the unmanned aerial vehicle, the handheld control device, the head-mounted device, and the computer-readable storage medium provided by the present disclosure, the attitude information of the handheld control device may be obtained, and the control information of the unmanned aerial vehicle may be determined according to the attitude information. The control information of the unmanned aerial vehicle may be sent to the unmanned aerial vehicle such that the unmanned aerial vehicle performs corresponding actions according to the control information. The control information of the unmanned aerial vehicle may be sent to the head-mounted device, such that the head-mounted device displays a mark on the display device of the head-mounted device according to the control information of the unmanned aerial vehicle. The mark may be used to indicate the flight direction of the unmanned aerial vehicle. The user may be able to control the unmanned aerial vehicle by adjusting the attitude of the handheld control device, which is in line with human intuition. By displaying the mark to indicate the flight direction of the unmanned aerial vehicle, a more intuitive control experience may be brought to the user, to make flight control easier and safer.

The terminology used in the present disclosure is for the purpose of describing particular embodiments only and is not intended to limit the scope of the present disclosure.

The term "and/or" used in the present disclosure and the appended claims refers to any combination of one or more of the associated listed items and all possible combinations, and includes these combinations.

The above are only specific implementations of embodiments of the present disclosure, but the scope of the present disclosure is not limited to this. One of ordinary skill in the art can easily think of various equivalents within the technical scope disclosed in the present disclosure. These modifications or replacements shall be included within the scope of the present disclosure. Therefore, the protection scope of the present invention shall be subject to the protection scope of the claims.

What is claimed is:

1. A control method for the movable object comprising:
    obtaining attitude information of a handheld control device, the handheld control device including an accelerator device;
    determining control information of a movable object according to the attitude information of the handheld control device;
    sending the control information of the movable object to a head-mounted device, to enable the head-mounted device to display a mark on a display device of the head-mounted device according to the control information of the movable object, the mark indicating a moving direction of the movable object;
    obtaining an accelerator control value, the accelerator control value being generated based on a travel distance of an accelerator of the accelerator device, a travel range of the accelerator comprising at least a first region and a second region, a moving speed of the movable object being associated with the accelerator control value based on a first correspondence relationship or a second correspondence relationship, respectively, when the travel distance of the accelerator falls within the first region or the second region, the first correspondence relationship being different from the second correspondence relationship; and
    controlling the movable object to move according to the accelerator control value.

2. The method according to claim 1, wherein controlling the movable object according to the accelerator control value includes controlling a position of the movable object to remain unchanged in response to the accelerator control value being a minimum accelerator control value.

3. The method according to claim 1, wherein controlling the movable object according to the accelerator control value includes controlling the movable object to move toward the moving direction indicated by the mark at a preset moving speed in response to the accelerator control value being a maximum accelerator control value.

4. The method according to claim 1, wherein controlling the movable object according to the accelerator control value includes gradually increasing an increment of the moving speed of the movable object in response to the accelerator control value changing uniformly from a minimum accelerator control value to a maximum accelerator control value.

5. The method according to claim 1,
    wherein the movable object includes a photographing device;
    the method further comprising:
        sending image information captured by the photographing device to the head-mounted device, to enable the display device of the head-mounted device to superimpose and display the image information and the mark.

6. The method according to claim 5, wherein:
    the photographing device is installed on the movable object through a gimbal; and
    the control information of the movable object includes at least one of attitude control information of the movable object or attitude control information of the gimbal.

7. The method according to claim 6, wherein:
a yaw attitude of the movable object is related to at least one of a yaw attitude or a roll attitude of the handheld control device; and/or
a pitch attitude of the gimbal is related to a pitch attitude of the handheld control device.

8. The method according to claim 1, wherein determining the control information of the movable object includes at least one of:
determining the control information of the movable object for moving the mark to the left or right according to at least one of a yaw angle or a roll angle of the handheld control device; or
determining the control information of the movable object for moving the mark up or down according to a pitch angle of the handheld control device.

9. The method according to claim 1, wherein determining the control information of the movable object according to the attitude information of the handheld control device includes:
obtaining reference attitude information of the handheld control device; and
determining the control information of the movable object according to the attitude information of the handheld control device and the reference attitude information of the handheld control device.

10. The method according to claim 9, wherein determining the control information of the movable object according to the attitude information of the handheld control device and the reference attitude information of the handheld control device includes:
obtaining reference attitude information of the movable object; and
determining the control information of the movable object according to the attitude information of the handheld control device, the reference attitude information of the handheld control device, and the reference attitude information of the movable object.

11. The method according to claim 10, wherein:
obtaining the reference attitude information of the handheld control device includes using attitude information of the handheld control device when an initialization operation is triggered as the reference attitude information of the handheld control device; and
obtaining the reference attitude information of the movable object includes using attitude information of the movable object when the initialization operation is triggered as the reference attitude information of the movable object.

12. The method according to claim 11, wherein:
obtaining the reference attitude information of the handheld control device includes using a yaw angle of the handheld control device when an initialization operation is triggered as a reference yaw angle of the handheld control device;
obtaining the reference attitude information of the movable object includes using a yaw angle of the movable object when the initialization operation is triggered as a reference yaw angle of the movable object; and
a reference pitch angle and a reference roll angle of the handheld control device are preset values.

13. The method according to claim 11, wherein using the attitude information of the handheld control device when the initialization operation is triggered as the reference attitude information of the handheld control device and using the attitude information of the movable object when the initialization operation is triggered as the reference attitude information of the movable object include:
in response to the attitude information of the handheld control device when the initialization operation is triggered satisfying a preset condition:
using the attitude information of the handheld control device when the initialization operation is triggered as the reference attitude information of the handheld control device, and
using the attitude information of the movable object when the initialization operation is triggered as the reference attitude information of the movable object; and
in response to the attitude information of the handheld control device when the initialization operation is triggered not satisfying the preset condition, outputting prompt information to prompt a user to adjust an attitude of the handheld control device.

14. The control method according to claim 1, wherein the moving direction of the movable object indicated by the mark comprises a direction of a future movement.

15. A handheld control device comprising:
an attitude sensor configured to obtain attitude information of the handheld control device;
an accelerator device;
one or more processors working individually or jointly to obtain an accelerator control value, the accelerator control value being generated based on a travel distance of an accelerator of the accelerator device, a travel range of the accelerator comprising at least a first region and a second region, a moving speed of the movable object being associated with the accelerator control value based on a first correspondence relationship or a second correspondence relationship, respectively, when the travel distance of the accelerator falls within the first region or the second region, the first correspondence relationship being different from the second correspondence relationship; and
a communication circuit configured to:
send the attitude information of the handheld control device to a movable object, to enable the movable object to determine control information of the movable object according to the attitude information of the handheld control device, and to cause the movable object to send the control information of the movable object to a head-mounted device, to enable the head-mounted device to display a mark on a display device of the head-mounted device according to the control information of the movable object, the mark indicating a moving direction of the movable object; and
send the accelerator control value to the movable object, to enable the movable object to control the movable object to move in the moving direction indicated by the mark according to the accelerator control value.

16. The handheld control device according to claim 15, wherein a position of the movable object is controlled to remain unchanged in response to the accelerator control value being a minimum accelerator control value.

17. The handheld control device according to claim 15, wherein the movable object is controlled to move toward the moving direction indicated by the mark at a preset moving speed in response to the accelerator control value being a maximum accelerator control value.

18. The handheld control device according to claim 15, wherein an increment of the moving speed of the movable object being controlled to gradually increase in response to the accelerator control value changing uniformly from a minimum accelerator control value to a maximum accelerator control value.

19. A movable object comprising:

a first communication circuit configured to obtain attitude information of a handheld control device;

one or more processors working individually or jointly to determine control information of the movable object according to the attitude information of the handheld control device; a second communication circuit configured to send the control information of the movable object to a head-mounted device, to enable the head-mounted device to display a mark on a display device of the head-mounted device according to the control information of the movable object, the mark indicating a moving direction of the movable object;

and wherein the first communication circuit is further configured to receive an accelerator control value from the handheld control device, to control the movable object to move in the moving direction indicated by the mark according to an accelerator control value, the accelerator control value being generated based on a travel distance of an accelerator of the accelerator device at the handheld control device, a travel range of the accelerator comprising at least a first region and a second region, a moving speed of the movable object being associated with the accelerator control value based on a first correspondence relationship or a second correspondence relationship, respectively, when the travel distance of the accelerator falls within the first region or the second region, the first correspondence relationship being different from the second correspondence relationship.

* * * * *